(12) United States Patent
Kim et al.

(10) Patent No.: US 10,470,133 B2
(45) Date of Patent: Nov. 5, 2019

(54) ELECTRONIC DEVICE AND METHOD FOR CONTROLLING APPLICATION AND COMPONENT

(71) Applicant: Samsung Electronics Co., Ltd., Suwon-si, Gyeonggi-do (KR)

(72) Inventors: Byungwook Kim, Suwon-si (KR); Sungyong Bang, Suwon-si (KR); Mooyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/432,477

(22) Filed: Feb. 14, 2017

(65) Prior Publication Data

US 2017/0245217 A1  Aug. 24, 2017

(30) Foreign Application Priority Data

Feb. 19, 2016 (KR) .................. 10-2016-0019659

(51) Int. Cl.
*H04M 1/00* (2006.01)
*H04W 52/02* (2009.01)
(Continued)

(52) U.S. Cl.
CPC ......... *H04W 52/0264* (2013.01); *H04W 4/80* (2018.02); *H04W 68/005* (2013.01);
(Continued)

(58) Field of Classification Search
CPC .. G06F 11/3062; G06F 1/3212; G06F 1/3268; G06F 1/3275; G06F 1/3287; H02J 2007/005; H04W 52/0261
See application file for complete search history.

(56) References Cited

U.S. PATENT DOCUMENTS 7,734,380 B2 6/2010 Ransom et al.
8,086,880 B2 12/2011 Ichikawa et al.
(Continued)

FOREIGN PATENT DOCUMENTS

EP 2 977 854 A1 1/2016
KR 10-1119428 B1 3/2012
(Continued)

OTHER PUBLICATIONS

European Search Report dated Dec. 4, 2018; European Appln. No. 17753470.8 / 1219 / 3391634.

*Primary Examiner* — Edward F Urban
*Assistant Examiner* — Max Mathew
(74) *Attorney, Agent, or Firm* — Jefferson IP Law, LLP

(57) ABSTRACT

An electronic device and an operating method thereof for monitoring, identifying and controlling an application and a component which excessively consume battery power are provided. The electronic device monitors an operation of an application installed therein or an operation of a component embedded therein. The electronic device checks the amount of power consumed for the operation of the application or the operation of the component at regular intervals, and based on the checked amount of power, determines whether the operation of the application or the operation of the component is an abnormal operation. If the operation of the application or the operation of the component is an abnormal operation, the electronic device identifies a policy corresponding to the abnormal operation and based on the identified policy, controls the operation of the application or the operation of the component to eliminate the abnormal operation.

17 Claims, 26 Drawing Sheets

(51) Int. Cl.
  *H04W 68/00* (2009.01)
  *H04W 4/80* (2018.01)
  *H04L 12/26* (2006.01)

(52) U.S. Cl.
  CPC .......... *H04L 43/0817* (2013.01); *H04L 43/16* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 2007/0030613 A1* | 2/2007 | Sousa | H04W 52/281 361/92 |
| 2008/0199954 A1 | 8/2008 | Donndelinger | |
| 2010/0331057 A1 | 12/2010 | Tanaka | |
| 2011/0040990 A1* | 2/2011 | Chan | G06F 1/28 713/300 |
| 2012/0110178 A1* | 5/2012 | Wu | H04L 41/0893 709/225 |
| 2012/0134517 A1* | 5/2012 | Sato | H04M 1/72522 381/150 |
| 2013/0179973 A1* | 7/2013 | Du | G06F 21/81 726/24 |
| 2014/0006816 A1 | 1/2014 | Oikawa | |
| 2015/0050922 A1* | 2/2015 | Ramalingam | H04W 12/08 455/418 |
| 2015/0161024 A1 | 6/2015 | Gupta et al. | |
| 2015/0230108 A1 | 8/2015 | Sridhara et al. | |
| 2015/0233985 A1* | 8/2015 | Chen | G01R 21/133 702/60 |
| 2015/0262067 A1 | 9/2015 | Sridhara et al. | |
| 2016/0048682 A1 | 2/2016 | Gou et al. | |
| 2016/0234116 A1* | 8/2016 | Lee | H04L 29/08 |
| 2017/0177059 A1* | 6/2017 | Fan | G06F 1/3212 |

FOREIGN PATENT DOCUMENTS

| | | |
|---|---|---|
| KR | 10-2012-0085724 A | 8/2012 |
| KR | 10-2014-0080225 A | 6/2014 |
| KR | 10-2015-0121887 A | 10/2015 |

\* cited by examiner

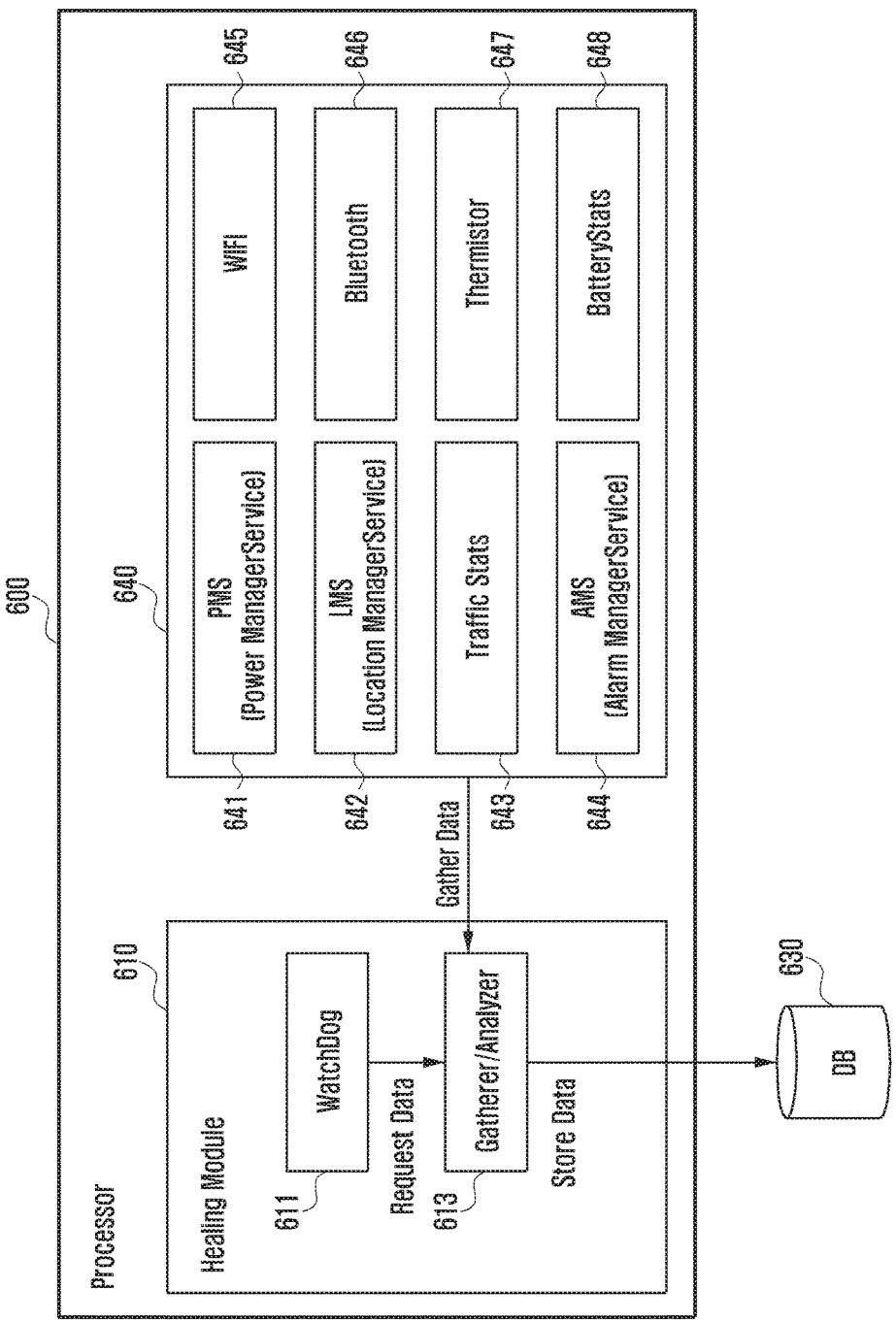

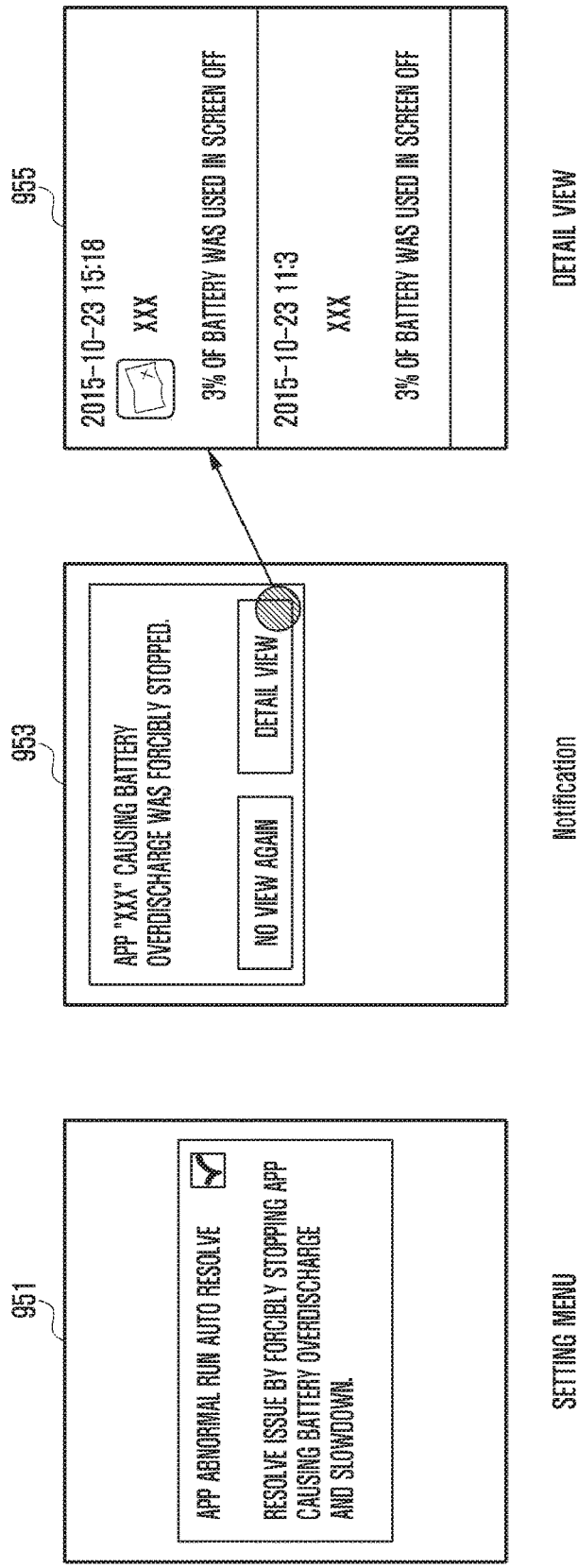

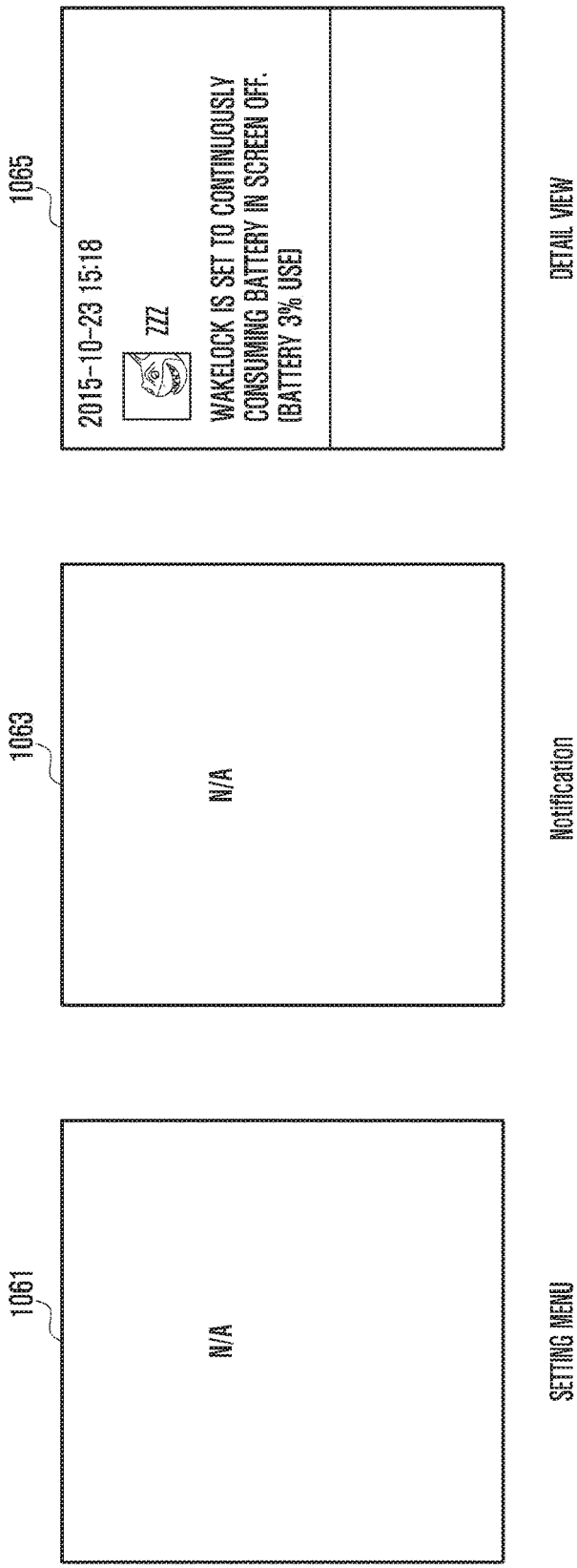

ELECTRONIC DEVICE AND METHOD FOR CONTROLLING APPLICATION AND COMPONENT

CROSS-REFERENCE TO RELATED APPLICATION(S)

This application claims the benefit under 35 U.S.C. § 119(a) of a Korean patent application filed on Feb. 19, 2016 in the Korean Intellectual Property Office and assigned Serial number 10-2016-0019659, the entire disclosure of which is hereby incorporated by reference.

TECHNICAL FIELD

The present disclosure relates to an electronic device and method for monitoring, identifying and controlling an application and a component which excessively consume battery power.

BACKGROUND

A mobile electronic device, e.g., a smart phone, may receive power from a battery equipped therein. In such an electronic device using a battery, power management is one of many essential factors. With the extensive utilization of electronic devices using battery power, often such an electronic device requires a larger battery capacity. However, batteries equipped in electronic devices are inherently limited in their sizes. Thus, electronic devices need to effectively use limited battery capacity.

Normally, an electronic device consumes battery power so as to execute applications installed in a memory and also to operate internal components. The electronic device can provide, to a user, information about battery power consumed by respective applications. Further, the electronic device may terminate, under the user's control, the execution of a certain application which excessively consumes battery power.

However, when any forcibly terminated application is executed again, battery over-consumption problems may be repeated. In addition, when excessive battery power consumption is caused by only a part of all operations of an application, terminating all the operations of the application may not be an optimal solution.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide an electronic device and a method for monitoring, identifying and controlling the operation of an application and/or the operation of a component based on an established policy.

In accordance with an aspect of the present disclosure, an electronic device is provided. The electronic device includes a memory configured to store an application and store a policy for controlling an operation of at least one of the application and a component of the electronic device, a power management module configured to check an amount of power consumed for the operation of at least one of the application and the component, and at least one processor. The at least one processor is configured to monitor the operation of at least one of the application stored in the memory and the component and through the power management module, check the amount of power consumed for the operation of the at least one of the application and the component at regular intervals, and determine based on the checked amount of power, whether the operation of the at least one of the application and the component is an abnormal operation. If the operation of the at least one of the application and the component is found to be an abnormal operation, the at least one processor is further configured to identify from the memory, a policy corresponding to the abnormal operation and based on the identified policy, control the operation of the at least one of the application and the component to eliminate the abnormal operation.

In accordance with another aspect of the present disclosure, an operating method of an electronic device is provided. The operating method includes monitoring an operation of at least one of an application installed in the electronic device and a component embedded in the electronic device, checking an amount of power consumed for the operation of the at least one of the application and the component at regular intervals and based on the checked amount of power, determining whether the operation of the at least one of the application and the component is an abnormal operation. If the operation of the at least one of the application and the component is found to be an abnormal operation, the operating method includes identifying a policy corresponding to the abnormal operation and based on the identified policy, controlling the operation of the at least one of the application and the component to eliminate the abnormal operation.

According to various embodiments of the present disclosure, it is possible to detect an application excessively consuming battery power or to notify the user of a cause of such excessive consumption of battery power. Also, various embodiments of the present disclosure may establish policies for controlling operations of applications and/or components in order to obviate excessive power consumption and, based on the established policies, control the operations of the applications and/or components. Various embodiments of the present disclosure may allow a more effective use of battery power.

Other aspects, advantages and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 6A, 6B, 6C and 6D are diagrams illustrating operations performed by components of a processor in controlling an application and a component, which cause excessive power consumption, according to various embodiments of the present disclosure;

FIGS. 9A, 9B, 9C and 9D are diagrams illustrating operations of providing a notification about an application and a component, which cause excessive power consumption, in a display-on status according to various embodiments of the present disclosure;

FIGS. 10A, 10B and 10C are diagrams illustrating operations of providing a notification about an application and a component, which cause excessive power consumption, in a display-off status according to various embodiments of the present disclosure;

Throughout the drawings, it should be noted that like reference numbers are used to depict the same or similar elements, features and structures.

DETAILED DESCRIPTION

Figure 1:
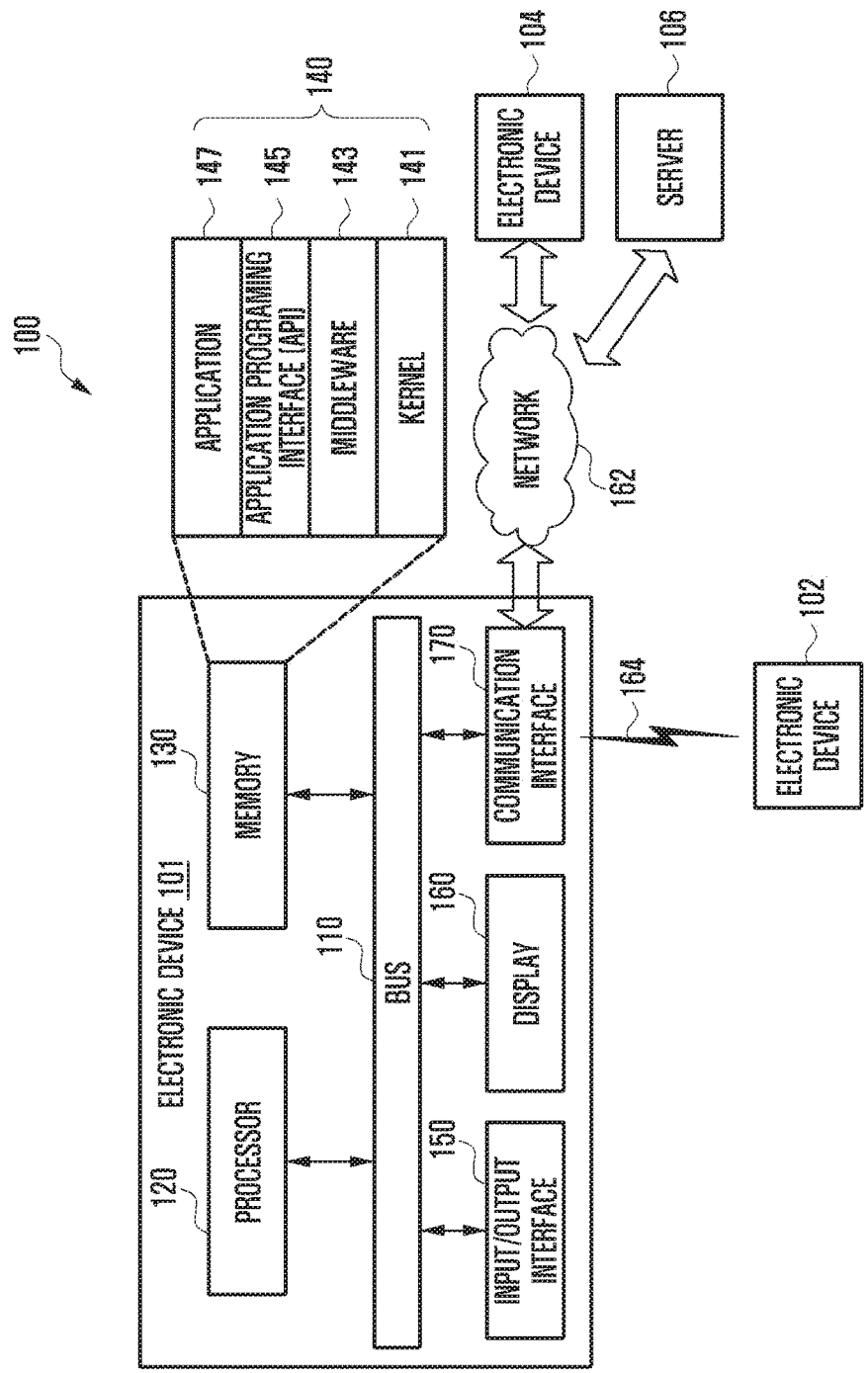
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", may include plural referents unless the context clearly dictates otherwise. Thus, for example, reference to "a component surface", includes reference to one or more of such surfaces.

In various embodiments of the present disclosure, the terms such as "include", "have", "may include" or "may have", may be construed to denote a certain characteristic, number, operation, constituent element, component or combination thereof, but should not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second", used in various embodiments of the present disclosure, may modify various components of the various embodiments, but does not limit the corresponding components. For example, the above expressions do not limit the sequence and/or importance of the components. The expressions may be used for simply distinguishing one component from other components. For example, a first user device and a second user device indicate different user devices, although both of them are user devices. For example, without departing from the scope of the present disclosure, a first structural element may be referred to as a second structural element. Similarly, the second structural element may be referred to as a first structural element.

When it is stated that a component is "(operatively or communicatively) coupled to" or "connected to" another component, the component may be directly coupled or connected to another component, or an additional component may exist between the component and another component. In contrast, when it is stated that a component is "directly coupled to" or "directly connected to" another component, an additional component or other feature does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" should not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., central processing unit (CPU) or application processor (AP)) that may execute one or more software programs stored in a memory device to perform corresponding functions.

An electronic device according to various embodiments of the present disclosure may be a device, including an antenna. For example, the electronic device may be one or more of the following: a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical application, a camera, a wearable device (for example, a head-mounted-device (HMD), such as electronic glasses, electronic clothes, an electronic bracelet, an electronic necklace, an electronic appcessary, an electronic tattoo, and a smart watch) and the like.

According to some embodiments, the electronic device may be a smart home appliance having an antenna. The smart home appliance may include at least one of the following: a television (TV), a digital video disc (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, an electronic frame and the like.

According to some embodiments, the electronic device may include at least one of the following: various types of medical devices (for example, magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, a point of sale (POS) device of shops and the like.

According to some embodiments, the electronic device may include at least one of the following: furniture or a part of a building/structure, an electronic board, an electronic signature receiving device, a projector, various types of measuring devices (for example, a water meter, an electricity meter, a gas meter, a radio wave meter and the like), which are equipped with an antenna and the like. The electronic device according to various embodiments of the present disclosure may also be a combination of the devices listed above. Further, the electronic device according to various embodiments of the present disclosure may be a flexible device. It should be apparent to those skilled in the art that the electronic device according to various embodiments of the present disclosure is not limited to the above described devices.

Hereinafter, an electronic device according to various embodiments will be discussed with reference to the accompanying drawings.

FIG. 1 illustrates a network environment including an electronic device according to various embodiments of the present disclosure.

Referring to FIG. 1, an electronic device 101 of a network environment 100 may include a bus 110, a processor 120, a memory 130, an input/output interface 150, a display 160, and a communication interface 170. According to some embodiments, at least one of the above described components may be omitted from the electronic device 101 or other components may be included in the electronic device 101.

The bus 110 may be a circuit for connecting the above described components 120, 130, 150, 160, and 170 and transmitting communications (e.g., control messages and/or data) between the above described components.

The processor 120 is capable of including one or more of the following: a CPU, an AP, and a communication processor (CP). The processor 120 is further capable of controlling at least one of the other components of the electronic device 101, and/or processing data or operations related to communications.

The memory 130 is capable of including volatile memory and/or non-volatile memory. The memory 130 is further capable of storing data or commands related to at least one of the other components of the electronic device 101. According to an embodiment, the memory 130 is further capable of storing software and/or a program module 140. For example, the program module 140 is capable of including a kernel 141, middleware 143, an application programming interface (API) 145, application programs (or applications) 147 and the like. The kernel 141, middleware 143 and/or at least part of the API 145 may comprise an operating system (OS).

The kernel 141 is capable of controlling or managing system resources (e.g., the bus 110, processor 120, memory 130 and so forth) used to execute operations or functions of other programs (e.g., the middleware 143, API 145 and application programs 147). The kernel 141 provides an interface capable of allowing the middleware 143, API 145 and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130 and so forth) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control or the like.

The input/output interface 150 is capable of transferring instructions or data, received from a user or external devices, to one or more components of the electronic device 101. The input/output interface 150 is also capable of outputting instructions or data, received from one or more components of the electronic device 101, to the user or external devices.

The display 160 is capable of including a liquid crystal display (LCD), a flexible display, a transparent display, a light emitting diode (LED) display, an organic LED (OLED) display, micro-electro-mechanical systems (MEMS) display, an electronic paper display and the like. The display 160 is capable of displaying various types of content (e.g., texts, images, videos, icons, symbols and so forth). The display 160 may also be implemented with a touch screen. In this case, the display 160 is capable of receiving touches, gestures, proximity inputs or hovering inputs, via a stylus pen or a user's body.

The communication interface 170 is capable of establishing communication between the electronic device 101 and an external device (e.g., a first electronic device 102, a second electronic device 104, and/or a server 106). For example, the communication interface 170 is capable of communicating with an external device (e.g., the second external device 104 or server 106) connected to a network 162 via wired or wireless communication.

Wireless communication may employ, as a cellular communication protocol, at least one of the following: long-term evolution (LTE), LTE advanced (LTE-A), code division multiple access (CDMA), wideband CDMA (WCDMA), universal mobile telecommunications system (UMTS), wireless broadband (WiBro), global system for mobile communication (GSM) and the like. Wireless communication may also include short-wireless communication 164. Short-wireless communication 164 may include at least one of the following: WiFi, Bluetooth (BT), near field communication (NFC), magnetic secure transmission (MST), global navigation satellite system (GNSS) and the like. The GNSS may include at least one of the following: GPS, global navigation satellite system (Glonass), Beidou navigation satellite system (hereinafter called 'Beidou"), and Galileo, a European global satellite-based navigation system, according to GNSS using areas, bandwidths and so forth. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., local area network (LAN) or wide area network (WAN)), the Internet, and a telephone network.

The first and second external electronic devices 102 and 104 may be identical to or different from the electronic device 101 in terms of type or otherwise. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or server 106). According to an embodiment, when the electronic device needs to perform a function or service automatically or according to a request, it may not perform the function or service directly, but is capable of requesting at least part of the function or service from other electronic devices (e.g., electronic devices 102 and 104 or server 106). The other electronic devices (e.g., electronic devices 102 and 104 or server 106) are capable of executing the requested function or additional functions, and transmitting the results to the electronic device 101. The electronic device 101 processes the received results, or further proceeds with additional processes, to provide the requested function or service. To this end, the electronic device 101 may employ cloud computing, distributed computing, or client-server computing technology.

Figure 2:
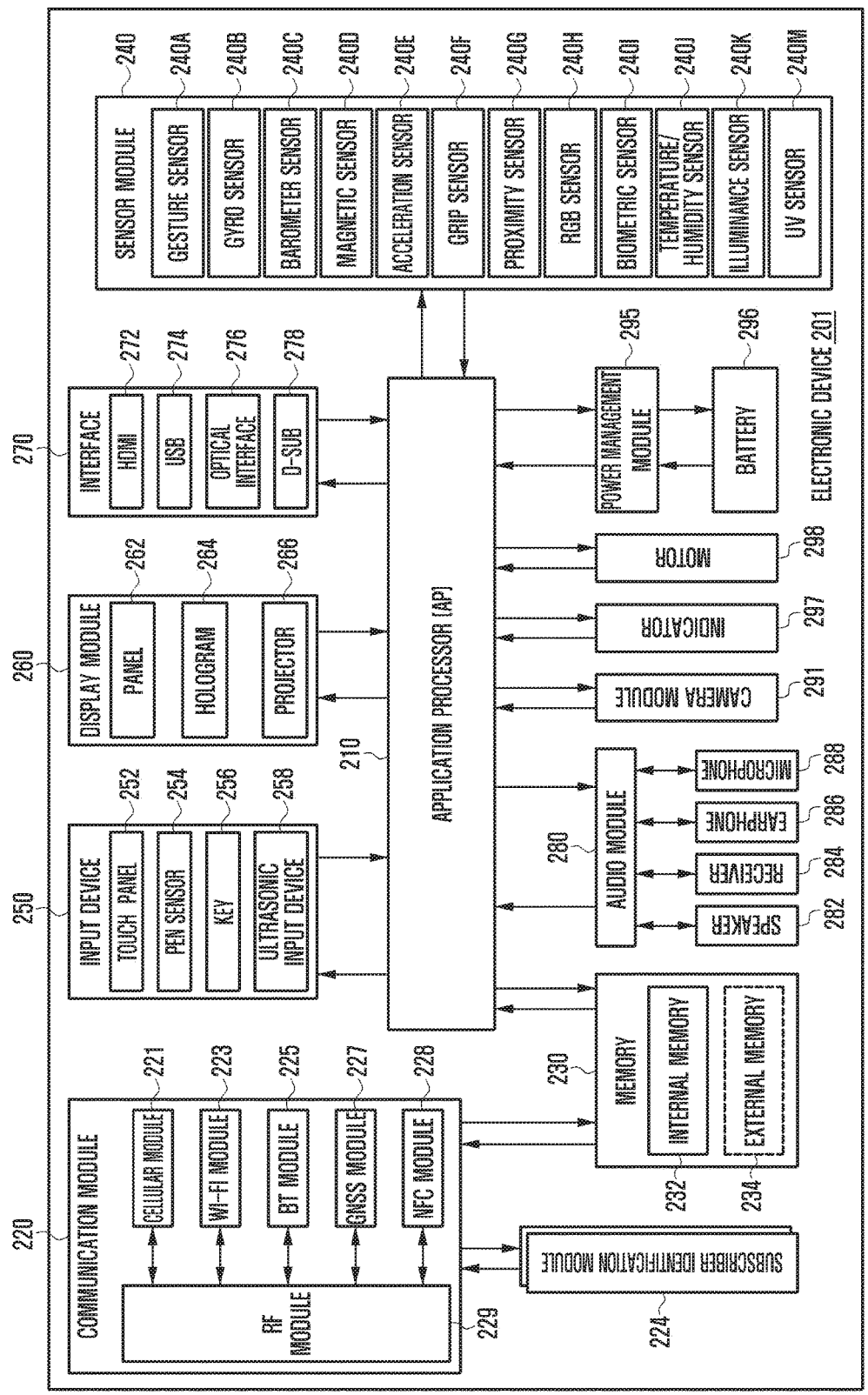
FIG. 2 is a block diagram illustrating an electronic device according to various embodiments of the present disclosure.

FIG. 2 is a detailed block diagram showing a configuration of an electronic device according to various embodiments of the present disclosure.

Referring to FIG. 2, an electronic device 201 is capable of including part or all of the components in the electronic device 101 shown in FIG. 1.

The electronic device 201 is capable of including one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an OS or an application program to control a plurality of hardware or software components connected to the processor 210, processing various data, and performing operations. The processor 210 may be implemented as, for example, a system on chip (SoC). According to an embodiment, the processor 210 may further include a graphics processing unit (GPU) and/or an image signal processor (ISP). The processor 210 may also include at least part of the components shown in FIG. 2, e.g., a cellular module 221. The processor 210 is also capable of loading commands or data received from at least one of the other components (e.g., a non-volatile memory) on a volatile memory, and processing the loaded commands or data. The processor 210 is also capable of storing various data in a non-volatile memory.

The communication module 220 may include the same or similar configurations as the communication interface 170 shown in FIG. 1. For example, the communication module 170 is capable of including the cellular module 221, a WiFi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, a short message service (SMS) service, an Internet service and the like, through a communication network, for example. According to an embodiment, the cellular module 221 is capable of identifying and authenticating an electronic device in a communication network by using a SIM (e.g., a SIM card). According to an embodiment, the cellular module 221 is capable of performing at least part of the functions provided by the processor 210. According to an embodiment, the cellular module 221 is also capable of including a CP.

Each of the WiFi module 223, the BT module 225, the GNSS module 227, and the NFC module 228, is capable of including a processor for processing data transmitted or received through the corresponding module. According to various embodiments, at least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna and the like. According to another embodiment, at least one of the following modules: cellular module 221, WiFi module 223, BT module 225, GNSS module 227, and NFC module 228, is capable of transmission/reception of RF signals through a separate RF module.

The SIM module 224 is capable of including a card including a SIM and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in or internal memory 232 and/or an external memory 234. The built-in memory 232 is capable of including at least one of the following: a volatile memory, e.g., a dynamic random access memory (DRAM), a static RAM (SRAM), a synchronous dynamic RAM (SDRAM) and the like; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory and the like), a hard drive, a solid state drive (SSD) and the like.

The external memory 234 is also capable of including a flash drive, e.g., a compact flash (CF), a secure digital (SD), a micro-SD, a mini-SD, an extreme digital (xD), a multimedia card (MMC), a memory stick and the like. The external memory 234 is also capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In various embodiments, the electronic device 201 is capable of including a processor, configured as part of the processor 210 or as a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, wearable and/or impact resistant. The panel 262 may also be incorporated into one module together with the touch panel 252. The hologram unit 264 is capable of showing a stereoscopic image in the air by using light interference. The projector 266 is capable of displaying an image by projecting light onto a surface or screen. The screen may be located inside or outside of the electronic device 201. According to an embodiment, the display 260 may further include a control circuit for controlling the panel 262, the hologram unit 264, or the projector 266.

The interface 270 is capable of including a HDMI 272, a USB 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, an SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, or microphone 288.

The camera module 291 refers to a device capable of taking both still and moving images. According to an embodiment, the camera module 291 is capable of including one or more image sensors (e.g., a front image sensor or a rear image sensor), a lens, an ISP, a flash (e.g., an LED or xenon lamp) and the like.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, electromagnetic charging and acoustic charging. To this end, the PIMC may further include an additional circuit for wireless charging, such as a coil loop, a resonance circuit, a rectifier and the like. The battery gauge is capable of measuring the residual capacity, charge in voltage, current, or temperature of the battery 296. The battery 296 may take the form of either a rechargeable battery or a solar battery, but embodiments are not limited thereto.

The indicator 297 is capable of displaying a specific status of the electronic device 201 or a part thereof (e.g., the processor 210), e.g., a boot-up status, a message status, a charging status and the like. The motor 298 is capable of converting an electrical signal into mechanical vibrations, such as a vibration effect, a haptic effect and the like. Although not shown, the electronic device 201 is capable of further including a processing unit (e.g., GPU) for supporting a mobile TV. The processing unit for supporting a mobile TV is capable of processing media data pursuant to applicable standards, e.g., digital multimedia broadcasting (DMB), digital video broadcasting (DVB), mediaFlo™ and the like.

Figure 3:
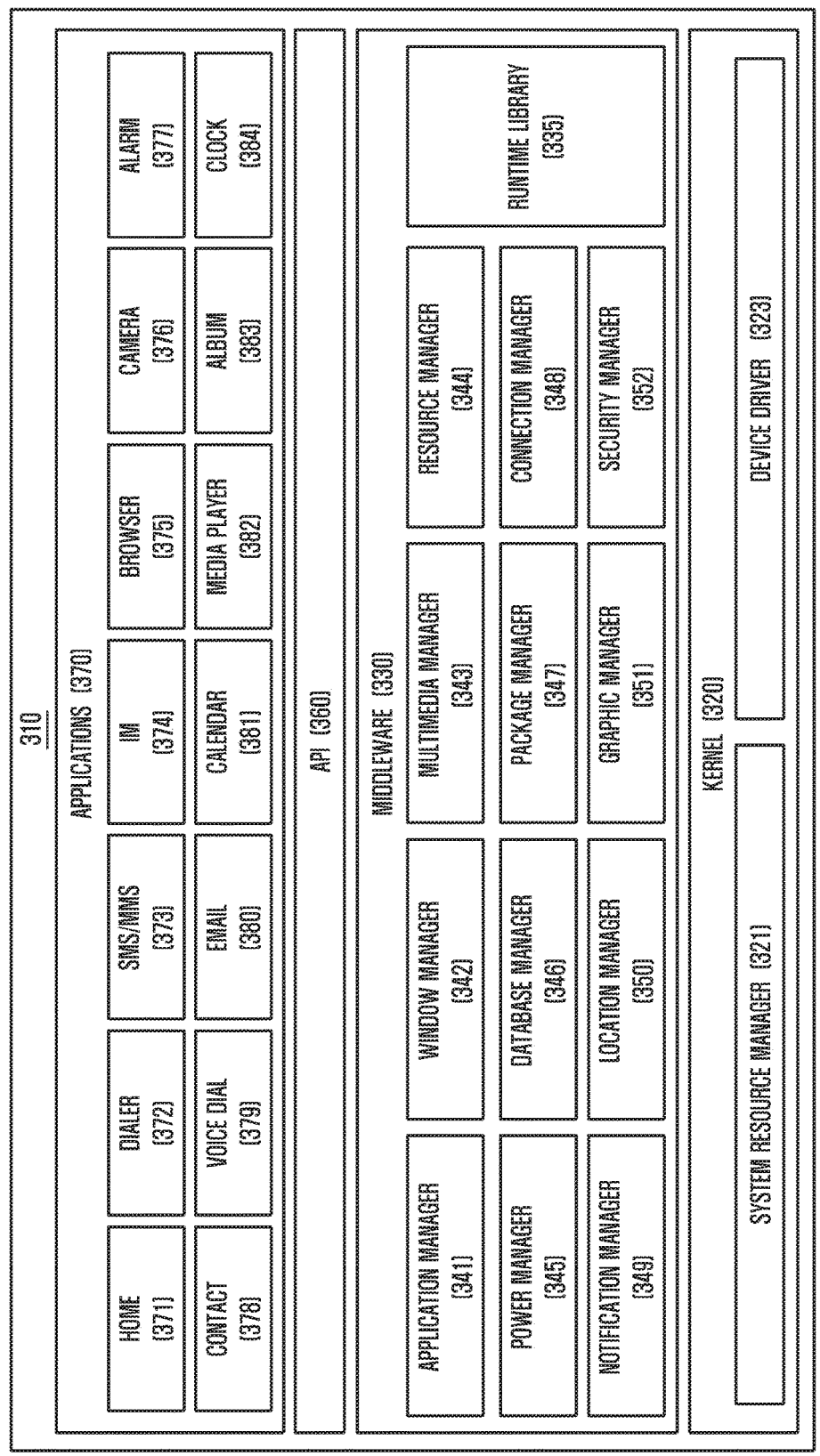
FIG. 3 is a block diagram illustrating a program module according to various embodiments of the present disclosure.

FIG. 3 is a block diagram of a programming module according to various embodiments of the present disclosure.

Referring to FIG. 3, according to an embodiment, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada and the like.

The program module 310 is capable of including a kernel 320, middleware 330, API 360 and/or applications 370. At least part of the program module 310 may be preloaded on the electronic device or downloaded from a server (e.g., the electronic device 102 or 104, server 106 and the like).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation and recall. The device driver 323 may include, for example, a display driver, a camera driver, a BT driver, a shared memory driver, a USB driver, a keypad driver, a WiFi driver and an audio driver. Further, according to an embodiment, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes both input and output, management of a memory, a function associated with an arithmetic function and the like.

The application manager 341 may manage, for example, a life cycle of at least one of the applications 370. The window manager 342 may also manage graphical user interface (GUI) resources used on the screen. The multimedia manager 343 may detect a format required for reproducing various media files and perform an encoding or a decoding of a media file by using a codec suitable for the corresponding format. The resource manager 344 also manages resources such as a source code, a memory, or a storage space of at least one of the applications 370.

The power manager 345 may operate together with a basic input/output system (BIOS) to manage a battery or power supply, and provides power information required for operations. The database manager 346 may manage generation, search and change of database to be used by at least one of the applications 370. The package manager 347 may manage an installation or an update of an application distributed in a form of a package file.

The connection manager 348 may manage, for example, a wireless connection such as WiFi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules of various combinations of functions of the above described components. The middleware 330 is also capable of providing modules that are specialized according to types of operation systems to provide distinct functions. The middleware 330 may also be adaptively configured in such a way as to dynamically remove existing components or include new components in such modules.

The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/multimedia messaging service (MMS) 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level and the like), and environment information (e.g., an application for providing atmospheric pressure, humidity, temperature and the like).

According to an embodiment, the applications 370 are capable of including an application for supporting information exchange between an electronic device (e.g., electronic device 101) and an external device (e.g., electronic devices 102 and 104), which is hereafter called an 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application and the like) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the functions include a function of turning-on/off the external device or part of the external device, a function of controlling the brightness (or resolution) of the display, applications running on the external device, services provided by the external device and the like. Examples of the services include a call service, a messaging service and the like.

According to an embodiment, the applications 370 are also capable of including an application (e.g., a health care application of a mobile medical device and the like) specified attributes of an external device (e.g., electronic devices 102 and 104). According to an embodiment, the applications 370 are also capable of including applications received from an external device (e.g., the server 106, or electronic devices 102 and 104). According to an embodiment, the applications 370 are also capable of including a preloaded application or third party applications that can be downloaded from a server. It should be understood that the components of the program module 310 may be called different names according to the type of OS.

According to various embodiments, at least part of the program module 310 can be implemented with software, firmware, hardware or any combination thereof. At least a part of the program module 310 can be implemented (e.g., executed) by a processor (e.g., processor 210). At least part of the programing module 310 may also include modules, programs, routines, sets of instructions or processes and the like, in order to perform one or more functions.

The term "module" used in this disclosure may refer to a certain unit that includes one of hardware, software and firmware or any combination thereof. The module may be interchangeably used with unit, logic, logical block, component or circuit, for example. The module may be the minimum unit, or part thereof, which performs one or more particular functions. The module may also be formed mechanically or electronically. For example, the module disclosed herein may include at least one of an application-specific integrated circuit (ASIC) chip, field-programmable gate arrays (FPGAs), and programmable-logic device, which have been known or are to be developed.

Figure 4:
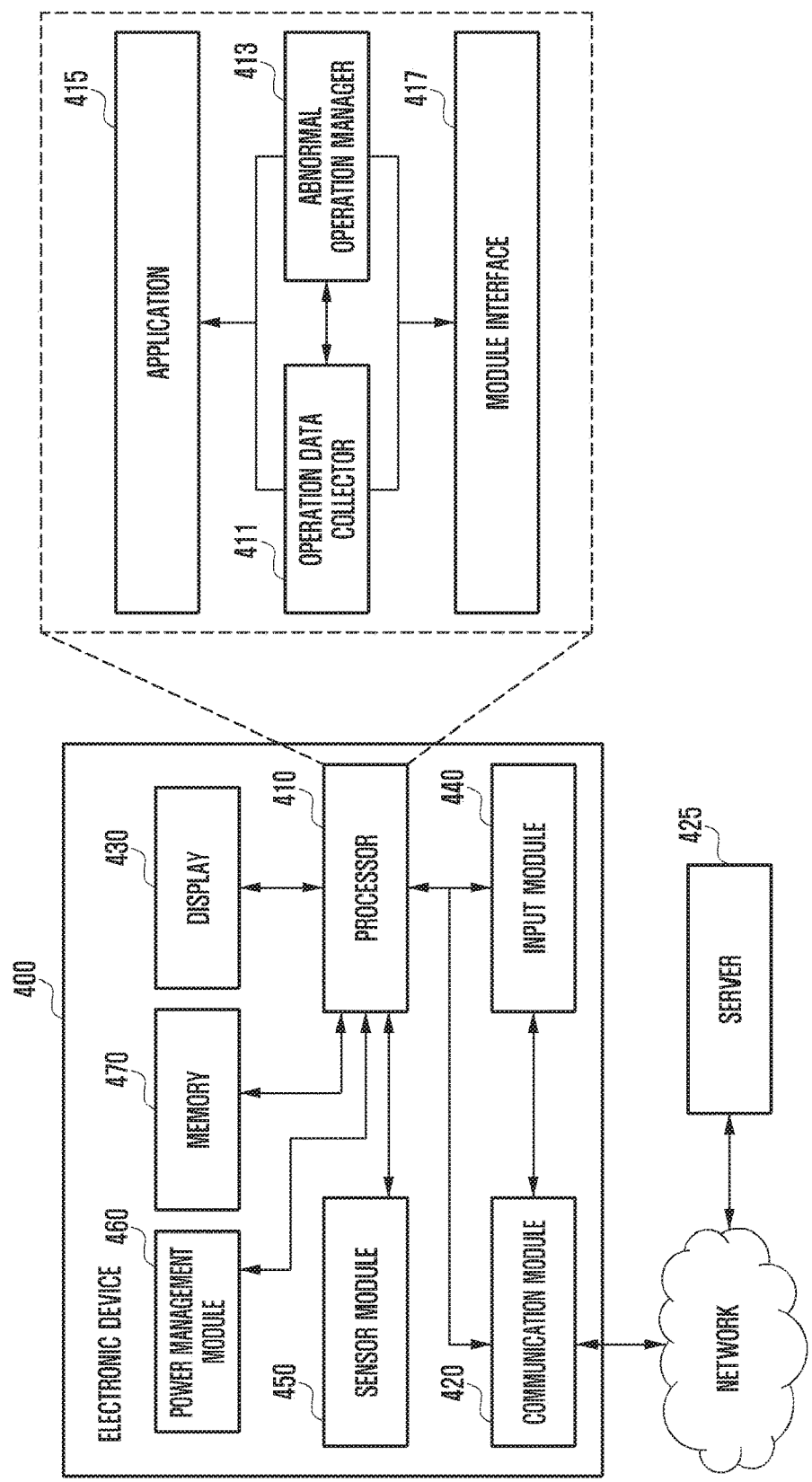
FIG. 4 is a block diagram illustrating an electronic device for controlling an application and a component, which cause excessive power consumption, according to various embodiments of the present disclosure.

FIG. 4 is a block diagram illustrating an electronic device for controlling one or more of an application and a component, which separately or in combination cause excessive power consumption, according to various embodiments of the present disclosure.

Referring to FIG. 4, an electronic device 400 (e.g., the electronic device 201 in FIG. 2) includes various internal components. According to various embodiments, the electronic device 400 may include a processor 410 (e.g., the processor 210 in FIG. 2), a communication module 420 (e.g., the communication module 220 in FIG. 2), a display 430 (e.g., the display 260 in FIG. 2), an input module 440 (e.g., the input device 250 in FIG. 2), a sensor module 450 (e.g., the sensor module 240 in FIG. 2), a power management module 460, and a memory 470. The electronic device 400 may be connected to a server 425 through a network, thus communicating with each other. The processor 410 of the electronic device 400 may control a plurality of hardware/software components connected thereto by driving an OS or otherwise suitable program.

According to various embodiments, the processor 410 may include an operation data collector 411, an abnormal operation manager 413, an application 415, and a module interface 417. The application 415 and the module interface 417 may be stored in the memory 470 (e.g., the memory 130 in FIG. 1) or included in the processor 410. The application 415 may be the application program 147 included in the memory 130 in FIG. 1, and the module interface 417 may be the API 145 in FIG. 1. The processor 410 may identify, through the operation data collector 411, the operation of the application 415 running in the electronic device 400. Also, by controlling the operation data collector 411, the processor 410 may identify the operation of components of the electronic device 400 through the module interface 417.

When the application 415 is running, the operation data collector 411 may identify which component among components of the electronic device 400 is currently used. Namely, the operation data collector 411 may identify a specific component being used by the electronic device 400, based on the application 415 and the module interface 417, and also collect information about the identified component.

When the application 415 and components of the electronic device 400 are operating, the abnormal operation manager 413 may control abnormally operating components. The processor 410 of the electronic device 400 may establish policies regarding abnormal situations. Also, the processor 410 may determine a particular abnormal situation of the electronic device 400, based on information collected through the operation data collector 411. In the case of any abnormal situation, the processor 410 may control the abnormally operating component through the abnormal operation manager 413, based on a particular policy established regarding the abnormal situation. In addition, the abnormal operation manager 413 may control the abnormal operation of the application 415 and the module interface 417.

According to various embodiments, the communication module 420 may have the same or similar configuration as the communication module 220 in FIG. 2. The electronic device 400 may be connected to the server 425 through the communication module 420 and thus perform communications. The communication 420 may communicate with the server 425 through the network.

According to various embodiments, the display 430 may have the same or similar configuration as the display 260 in FIG. 2. The processor 410 may enable the display 430 to display a user interface corresponding to the application 415. The display 430 may also include a touch screen, and may have a touch panel included in the input module 440.

According to various embodiments, the input module 440 may have the same or similar configuration as the input device 250 in FIG. 2. The input module 440 may receive a user input and perform a particular operation corresponding to the user input under the control of the processor 410.

According to various embodiments, the sensor module 450 may have the same or similar configuration as the sensor module 240 in FIG. 2. The sensor module 450 may detect an operating status of the electronic device 400 and convert the detected information into an electric signal.

According to various embodiments, the power management module 460 may have the same or similar configuration as the power management module 295 in FIG. 2. The processor 410 may identify, through the power management module 460, an amount of power (e.g., battery power or electric current) consumed by the application 415 or any component of the electronic device 400. The processor 410 may individually identify the amount of power consumed by each application 415.

According to various embodiments, the memory 470 may have the same or similar configuration as the memory 230 in FIG. 2. The memory 470 may store the application 415. The memory 470 may also store information about a policy for taking a countermeasure when the application 415 is abnormally running. According to various embodiments, the processor 410 may establish individual policy information for each application based on, for example, a user's or developer's setting. According to various embodiments, when any abnormal situation is caused by the operation of a specific application, the processor 410 may load the established policy information corresponding to the specific application from the memory 470. Then, based on the loaded policy information, the processor 410 may control the operation of the specific application.

According to various embodiments, through the operation data collector 411, the processor 410 of the electronic device 400 may detect a specific application which excessively consumes battery power, or identify the cause of excessive power consumption. If it is determined that such excessive power consumption is abnormal, the processor 410 may respond to the abnormal situation, based on the corresponding policy. For example, in order to respond to the abnormal situation, the processor 410 may take no action, may restrict all operations of the application or component or may restrict only some of the operations of the application or component.

According to various embodiments, the electronic device may include the memory configured to store an application and also to store a policy for controlling an operation of the application and an operation of a component of the electronic device, the power management module configured to check the amount of power consumed for the operation of the application or the operation of the component, and the processor. The processor may be configured to monitor the operation of the application stored in the memory or the operation of the component through the power management module, to check the amount of power consumed for the operation of the application or the operation of the component at regular intervals. Based on the checked amount of power, the processor may be further configured to determine whether the operation of the application or the operation of the component is an abnormal operation and if the operation of the application or the operation of the component is determined to be an abnormal operation, the processor may be further configured to identify the policy corresponding to the abnormal operation from the memory and based on the identified policy, control the operation of the application or the operation of the component.

The processor may be further configured, if the application is moved to background, to check whether a CPU usage rate corresponding to the operation of the application exceeds a first threshold and if the CPU usage rate exceeds the first threshold, to determine that the operation of the application is an abnormal operation.

The electronic device may further include a display, and the processor may be further configured, when the display is turned off, to check whether a wakelock of the application maintains an activated state for a time exceeding a second threshold. If the wakelock maintains the activated state for the time exceeding the second threshold, the processor may be further configured to determine whether the application is a music related application and if the application is not a music related application, determine that the operation of the application is an abnormal operation.

The processor may be further configured to control the operation of the application by releasing the wakelock so as to inactivate the wakelock of the application.

The processor may be further configured to provide a notification message indicating detailed information about release of the wakelock through the display.

The wakelock may be a command for waking the electronic device in a sleep mode or for preventing the electronic device from entering the sleep mode.

The processor may be further configured to detect a location request signal generated from the application, check whether a time interval of detecting the location request signal is less than a third threshold and if the time interval is less than the third threshold, determine that the operation of the application is an abnormal operation.

The processor may be further configured to detect a BT low energy (BLE) scanning request signal generated from the application, check whether a time interval of detecting the BLE scanning request signal is less than a fourth threshold and if the time interval is less than the fourth threshold, determine that the operation of the application is an abnormal operation.

The policy may be differently established regarding the operations of the application and the component so as to determine abnormal operations of the application and the component.

The policy may be established to terminate a part of the operations of the application and the component.

The policy may provide a notification message indicating the abnormal operation through a display.

Figure 5:
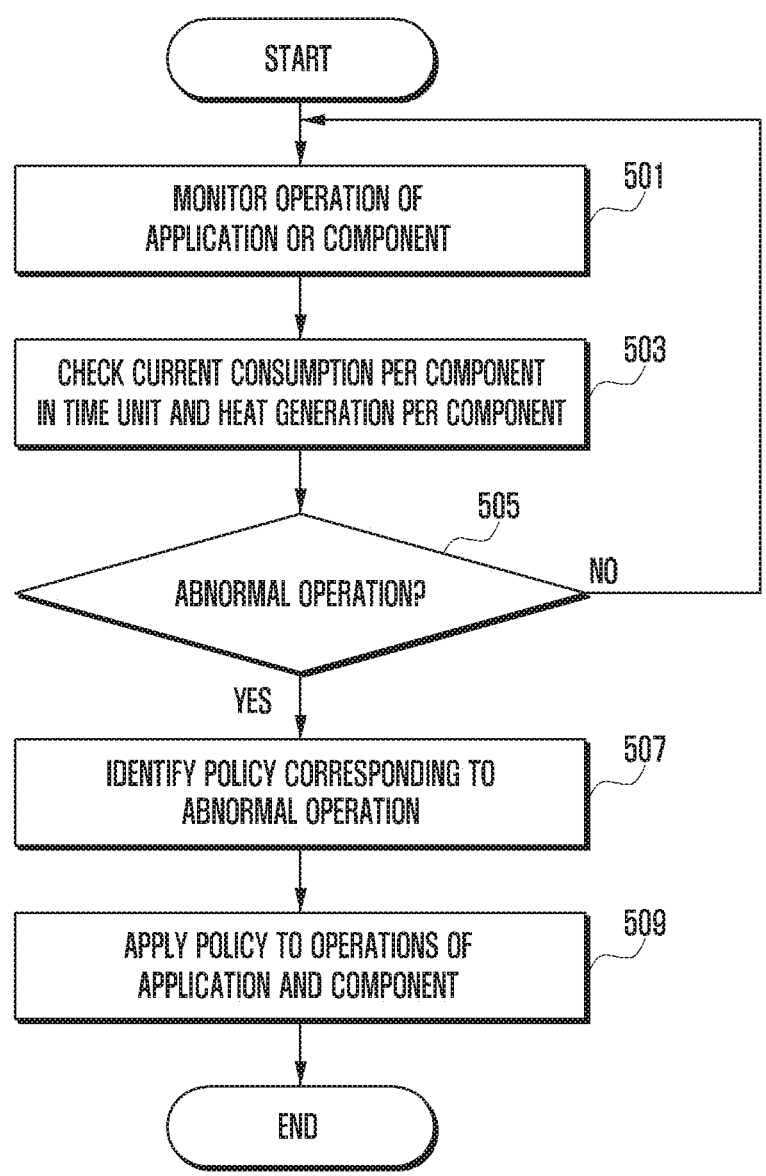
FIG. 5 is a flow diagram illustrating a method for controlling an application and a component, which cause excessive power consumption, according to various embodiments of the present disclosure.

FIG. 5 is a flow diagram illustrating a method for controlling one or more of an application and a component, which separately or in combination cause excessive power consumption, according to various embodiments of the present disclosure.

Referring to FIG. 5, at operation 501, the processor 410 of the electronic device 400 may monitor the operation of an application and/or the operation of a component of the electronic device 400. The application may be an application program installed in the memory 470. The electronic device component may refer to any component embedded in the electronic device 400. The processor 410 may continuously, aperiodically or periodically monitor the operations of applications and/or components, depending on setting. Additionally, the processor 410 may establish policies corresponding to the respective operations of applications and/or components. Then, based on the established policies, the processor 410 may monitor the operations of applications and/or components. For example, if a monitoring time interval is set to two minutes, the processor 410 may monitor the operations of applications and/or components every two minutes. This setting period may be changed by a user or a developer.

At operation 503, the processor 410 may check current consumption per component in a time unit (e.g., through a power management IC (IFPMIC) discussed below) and/or heat generation per component (e.g., through a thermistor discussed below). For example, when a specific application is in a running state, the processor 410 may monitor an electric current consumed and heat generated in connection with the running application. Normally, when a certain application is running, the electronic device 400 may generate heat while consuming an electric current. In addition, each application installed in the electronic device 400 may run according to or regardless of a user's intention. By checking current consumption per component in a time unit and heat generation per component, the processor 410 may detect whether an application is running regardless of a user's intention.

At operation 505, the processor 410 may determine whether the operation of a component is normal, based on the checked information about current consumption per component and heat generation per component. For example, the processor 410 may have or access predefined information corresponding to normal operations of respective components. If any information checked at operation 503 is out of a range of predefined normal operations, the processor 410 may determine that the operation of the component is abnormal. Also, the processor 410 may establish policies corresponding to the operations of applications and/or components and, based on the established policies, determine whether the operations of applications and/or components are abnormal. Such a policy may be established by a user or a developer.

For example, if the display of the electronic device is turned off or a game application enters a background state while the game application is running, the processor 410 may terminate the game application. However, a certain game application may be continuously running even when the display is turned off or even when the game application enters a background state. In this case, the game application is still running contrary to a user's intention and thus, the processor 410 may continuously consume battery power. Further, this battery consumption may cause the generation of heat. A typical application may set a wakelock, and if the wakelock maintains an activation state, the electronic device 400 may fail to enter a sleep mode. Namely, the electronic device 400 may be in a state of continuously operating the wakelock-activated application. The wakelock may indicate a function of waking the electronic device 400 in the sleep mode or preventing the electronic device 400 from entering the sleep mode. As described above, if an electric current is excessively consumed even when the display of the electronic device 400 is turned off or even when the application is moved to the background, the processor 410 of the electronic device 400 may determine that the operation of the application or component is abnormal.

If it is determined at operation 505 that the operation of the component is abnormal, the processor 410 may identify a policy corresponding to the abnormal operation at operation 507. The processor 410 may store policies respectively corresponding to abnormal operations in the memory 470. In a first example, if the wakelock of an application maintains an activated state by exceeding a given time when the application is moved to the background or when the display is turned off, the processor 410 may determine that this operation is abnormal. For this case, the processor 410 may establish a policy to be performed in response to this abnormal situation in which the wakelock maintains an activated state. For example, the processor 410 may perform a policy for releasing the activated state of the wakelock. Also, the processor 410 may differently set whether to perform the policy in response to each application installed in the memory 470.

In a second example, if an application excessively requests the location of the electronic device 400, the processor 410 may determine that this operation is abnormal. For this case, the processor 410 may establish a policy for displaying a notification message in connection with the application that frequently requests the location information.

In a third example, if an application excessively requests BLE scanning for the BT connection with other neighboring electronic device, the processor 410 may determine that this operation is abnormal. For this case, the processor 410 may establish a policy for displaying a notification message in connection with the application that frequently requests BLE scanning.

In response to the above cases of abnormal operations, the processor 410 may perform a particular operation corresponding to the established policy. For example, when any application program excessively consumes battery power by exceeding a normal range, the processor 410 may perform a policy corresponding to this situation. Namely, the processor 410 may control a specific component, in which the application program is running, of the electronic device 400 to stop operation.

After identifying a specific policy corresponding to the abnormal operation at operation 507, the processor 410 may apply the identified policy to the operations of corresponding application and component at operation 509. According to various embodiments, the policy corresponding to a specific abnormal operation may be changed totally or simply modified in part. According to various embodiments, in connection with abnormal operations, different policies may be established in response to different application.

FIGS. 6A, 6B, 6C and 6D are diagrams illustrating operations performed by components of a processor in controlling at least one or an application and a component, which separately or in combination cause excessive power consumption, according to various embodiments of the present disclosure.

Figure 6A:
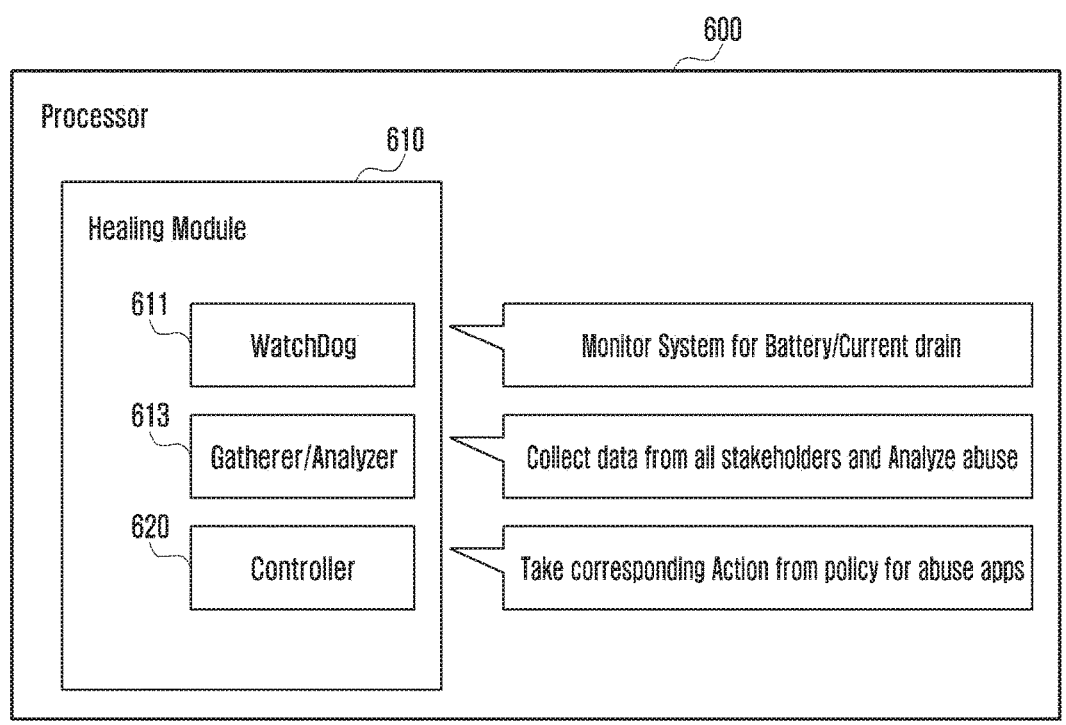

Referring to FIG. 6A, a processor 600 may include a healing module 610, which may be formed of a watchdog 611, a gatherer/analyzer 613, and a controller 620. The watchdog 611 may monitor battery consumption of the electronic device 400 at regular intervals. For example, based on a predefined period, the watchdog 611 may measure the amount of battery power consumed at each component of the electronic device 400. The gatherer/analyzer 613 may gather information about the monitored battery consumption and, based on the gathered information, analyze whether an operating state of the electronic device 400 is normal or abnormal. The controller 620 may take a particular action, based on a specific policy corresponding to the analysis result.

Referring to FIG. 6B, the processor 600 may gather data from components 640 of the electronic device 400 through the gatherer/analyzer 613. For example, the processor 600 may request data from the gatherer/analyzer 613 through the watchdog 611. In response to this request, the gatherer/analyzer 613 may gather data from the components 640 and then store the gathered data. The processor 600 may store the gathered data in a memory or database (DB) 630. The components 640 of the electronic device 400 may include a power manager service (PMS) 641 (e.g., the power manager 345 in FIG. 3), to manage the battery capacity or power and to offer electric power information, a location manager service (LMS) 642 (e.g., the location manager in FIG. 2), to offer location information of the electronic device, a traffic stats 643, to offer information about the amount of data usage, an alarm manager service (AMS) 644, to offer alarm information, a WIFI 645, to offer WIFI information, a BT 646, to offer BT information, a thermistor 647, to offer temperature information of each component and to offer heat generation information, a battery stats 648, to offer battery information), and the like. These components are not to be construed as a limitation of various embodiments, and embodiments of the present invention are not limited thereto.

Figure 6C:
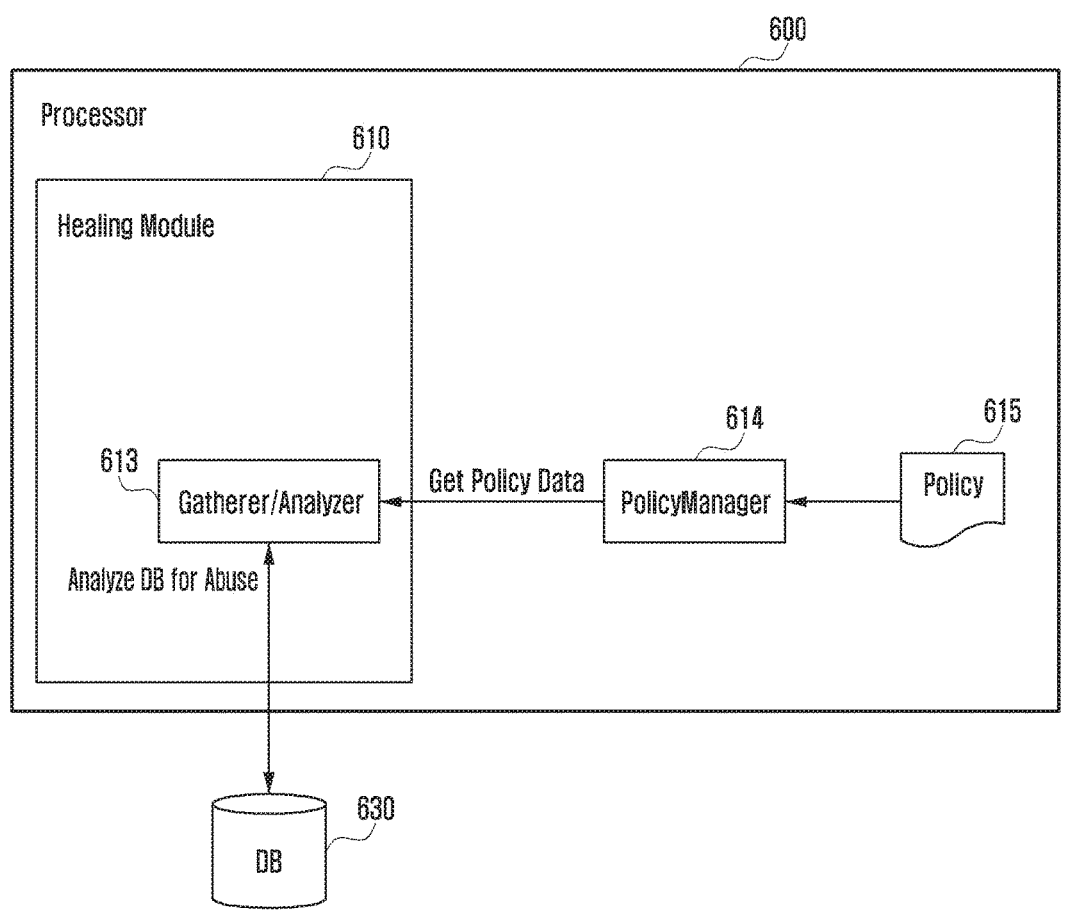

Referring to FIG. 6C, the processor 600 may also obtain policy data through the gatherer/analyzer 613. For example, the processor 600 may store policies corresponding to abnormal situations in the memory. The processor 600 may establish policies for determining abnormal situations regarding the operations of applications and/or components. Also, the processor 600 may establish policies for controlling the operations of applications and/or components in response to abnormal situations. These policies may be established by a user or a developer. The processor 600 may obtain policies 615 stored in the memory through a policy manager 614. The gatherer/analyzer 613 may determine abnormal situations, based on the obtained policies. The processor 600 may store the result of determination in the DB 630. Based on the data gathered in FIG. 6B and the policies obtained in FIG. 6C, the processor 600 may analyze whether each component of the electronic device 400 operates abnormally.

Figure 6D:
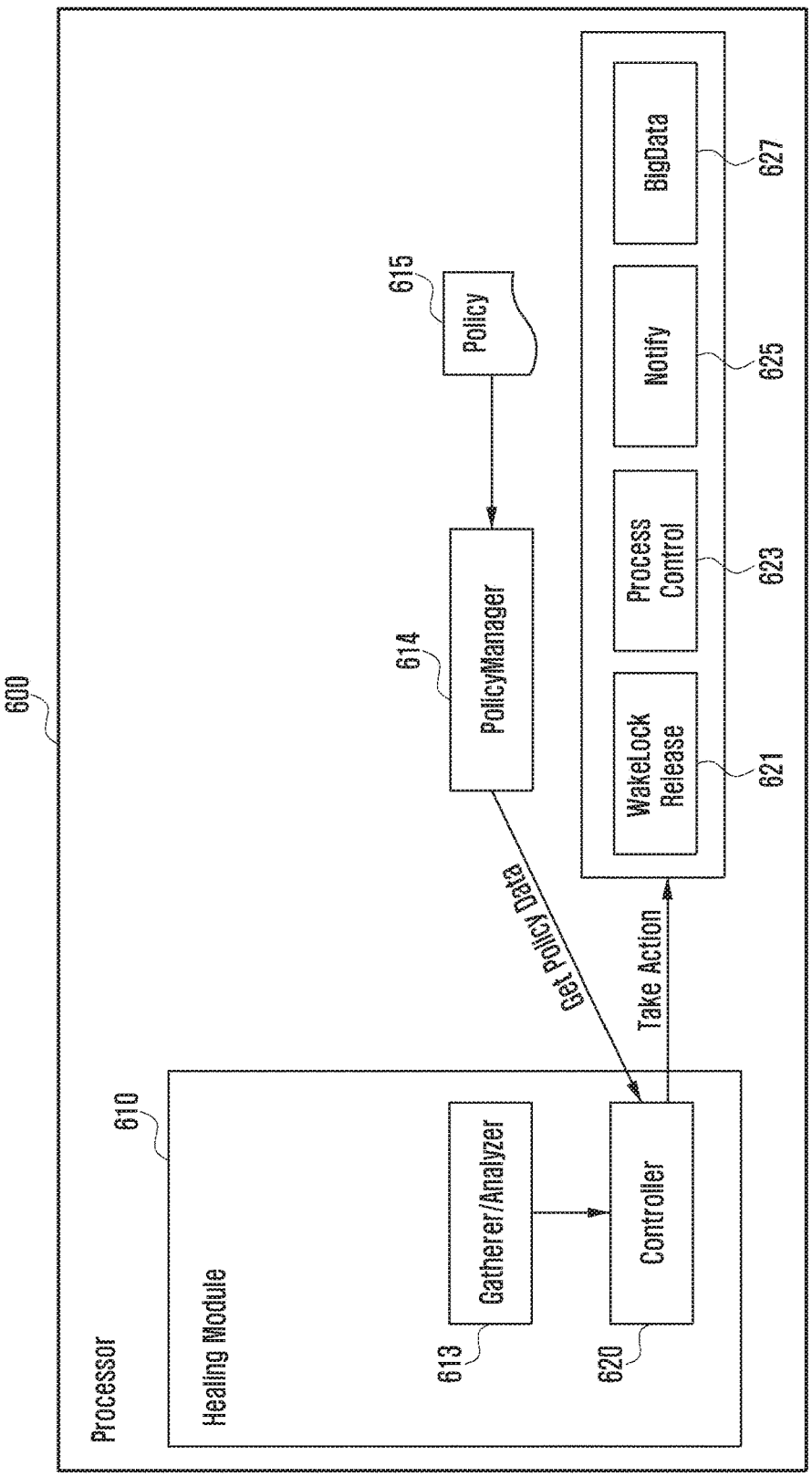

Referring to FIG. 6D, based on the data gathered in FIG. 6B and the policies obtained in FIG. 6C, and through the controller 620, the processor 600 may restrict the operation of an abnormally running component or notify a user of an abnormal situation. For example, the controller 620 may perform a wakelock release 621 of an abnormally running application. The wakelock may be a function of waking the electronic device 400 in the sleep mode or preventing the electronic device 400 from entering the sleep mode. Additionally, the controller 620 may perform a process control 623 of respective components (e.g., the components 640 shown in FIG. 6B) embedded in the electronic device 400 and also provide a notification 625 about an abnormal situation to a user. For example, if there are excessive requests for identifying the location of the electronic device 400, the controller 620 may control the location request operation by controlling the LMS (e.g., 642 in FIG. 6B). Also, the controller 620 may transmit information, as big data 627, about actions taken in response to the abnormal situation to a server.

Figure 7:
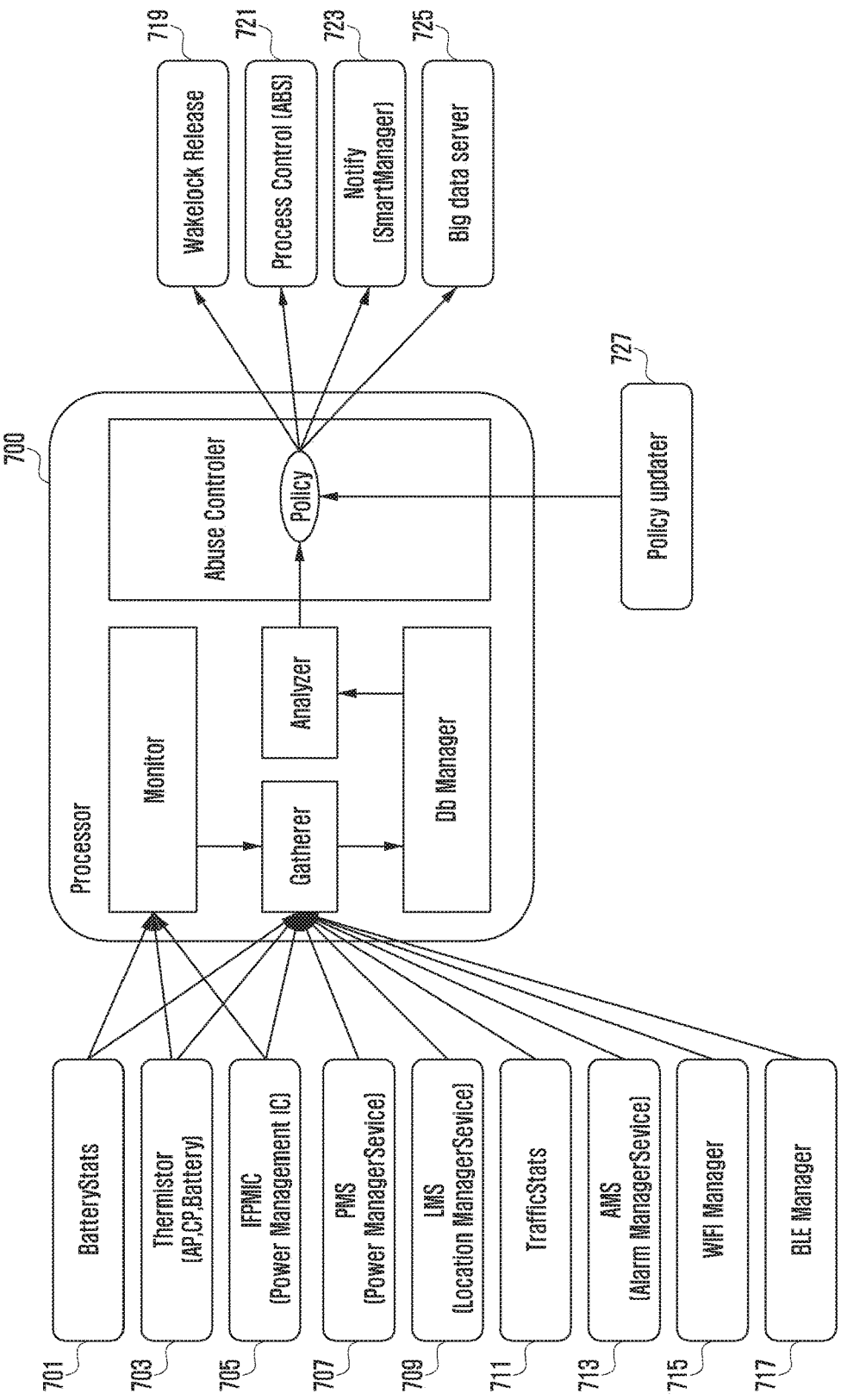
FIG. 7 is a diagram illustrating operations performed by components of an electronic device in controlling an application and a component, which cause excessive power consumption, according to various embodiments of the present disclosure.

FIG. 7 is a diagram illustrating operations performed by components of an electronic device in controlling at least one of an application and a component, which separately or in combination cause excessive power consumption, according to various embodiments of the present disclosure.

Referring to FIG. 7, a processor 700 and respective components of the electronic device 400 are shown. The processor 700 may monitor such components. For example, the processor 700 may continuously, aperiodically or periodically monitor a battery stats 701 (i.e., the battery stats 648 in FIG. 6B), to check a battery state, a thermistor 703 (i.e., the thermistor 647 in FIG. 6B), to check the temperature and heat generation of an AP, a CP and a battery, and an IFPMIC 705 (i.e., a power management IC), to check current consumption. Through this monitoring, the processor 700 may determine abnormally running situations of the electronic device 400.

Additionally, the processor 700 may gather information corresponding to the battery stats 701, the IFPMIC 705, a PMS 707 (i.e., the PMS 641 in FIG. 6B), an LMS 709 (i.e., the LMS 642 in FIG. 6B), a traffic stats 711 (i.e., the traffic stats 643 in FIG. 6B), an AMS 713 (i.e., the AMS 644 in FIG. 6B), a WIFI manager 715 (i.e., the WIFI 645 in FIG. 6B), and a BLE manager 717 (i.e., the BT 646 in FIG. 6B). The processor 700 may store the gathered information in a DB (i.e., a DB manager).

By analyzing the gathered information, the processor 700 may determine whether the operating state of the electronic device is abnormal. The processor 700 may store also policies associated with abnormal situations in the memory. Based on the policies stored in the memory, the processor 700 may determine abnormal states of the electronic device. If it is determined that the electronic device is in a certain abnormal state, the processor 700 may determine a particular policy corresponding to the abnormal state and then, based on the determined policy, take a suitable action. The policies stored in the memory may be updated by a policy updater 727. The action taken by the processor 700 may be at least one of a wakelock release 719 (i.e., the wakelock release 621 in FIG. 6D), a process control 721 (i.e., the process control 623 in FIG. 6D), a notification 723 (i.e., the notification 625 in FIG. 6D), and a delivery 725 to a big data server (i.e., the big data in FIG. 6D).

According to various embodiments, the processor 700 may determine such abnormal operations (e.g., abnormal current consumption, abnormal heat generation and the like) of applications installed in the electronic device and/or of components of the electronic device, and then may perform control over the applications and/or components.

Figure 8:
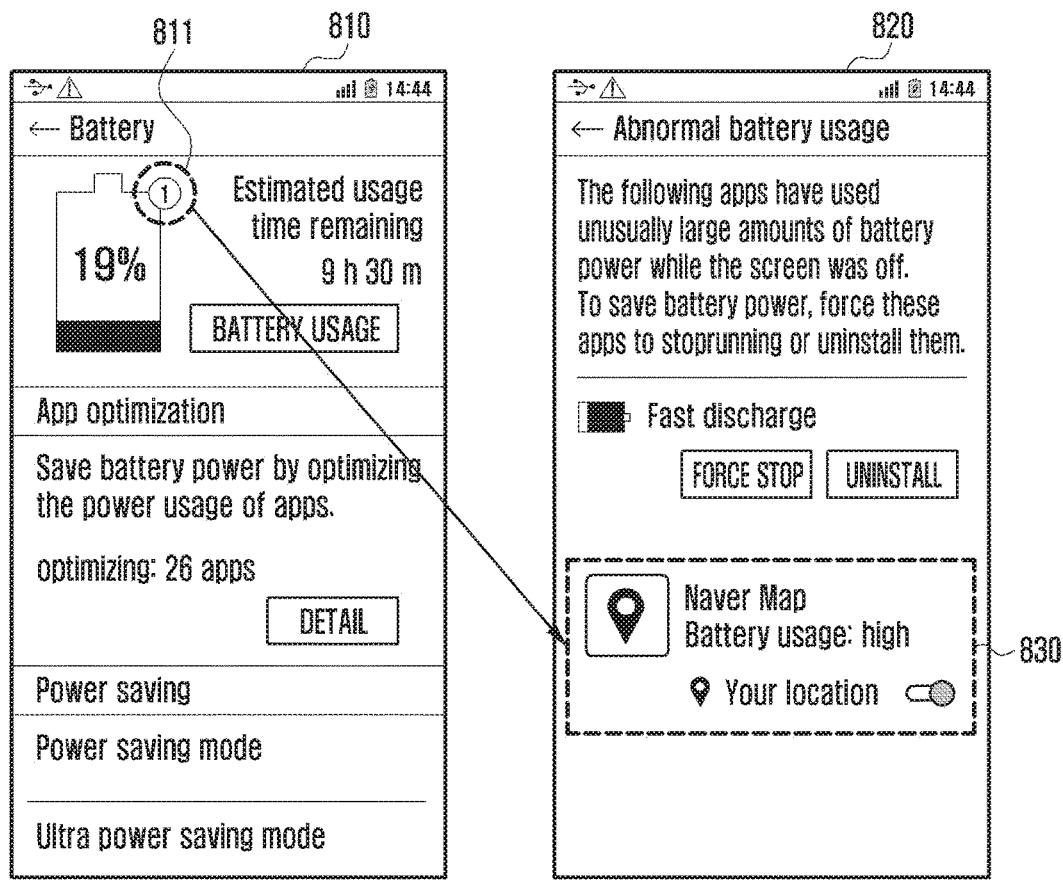
FIG. 8 is a diagram illustrating an example of a user interface for displaying a list of applications causing excessive power consumption, according to various embodiments of the present disclosure.

FIG. 8 is a diagram illustrating an example of a user interface for displaying a list of applications causing excessive power consumption, according to various embodiments of the present disclosure.

Referring to FIG. 8, the processor 410 may display a battery-related user interface 810 through the display 430. The battery-related user interface 810 may be a battery setting screen through which a user can set a battery usage. On the battery-related user interface 810, the processor 410 may display a notification 811 regarding an application which abnormally uses battery power. When a user selects the notification 811, the processor 410 may display a user interface 820 related to an abnormal battery usage. This user interface 820 may indicate the abnormally operating applications. In order to monitor abnormal operations, the processor 410 may selectively set whether to monitor each application and at what time intervals to monitor each application.

FIGS. 9A, 9B, 9C and 9D are diagrams illustrating operations of providing a notification about at least one of an application and a component, which separately or in combination cause excessive power consumption, in a display-on status according to various embodiments of the present disclosure.

Figure 9A:
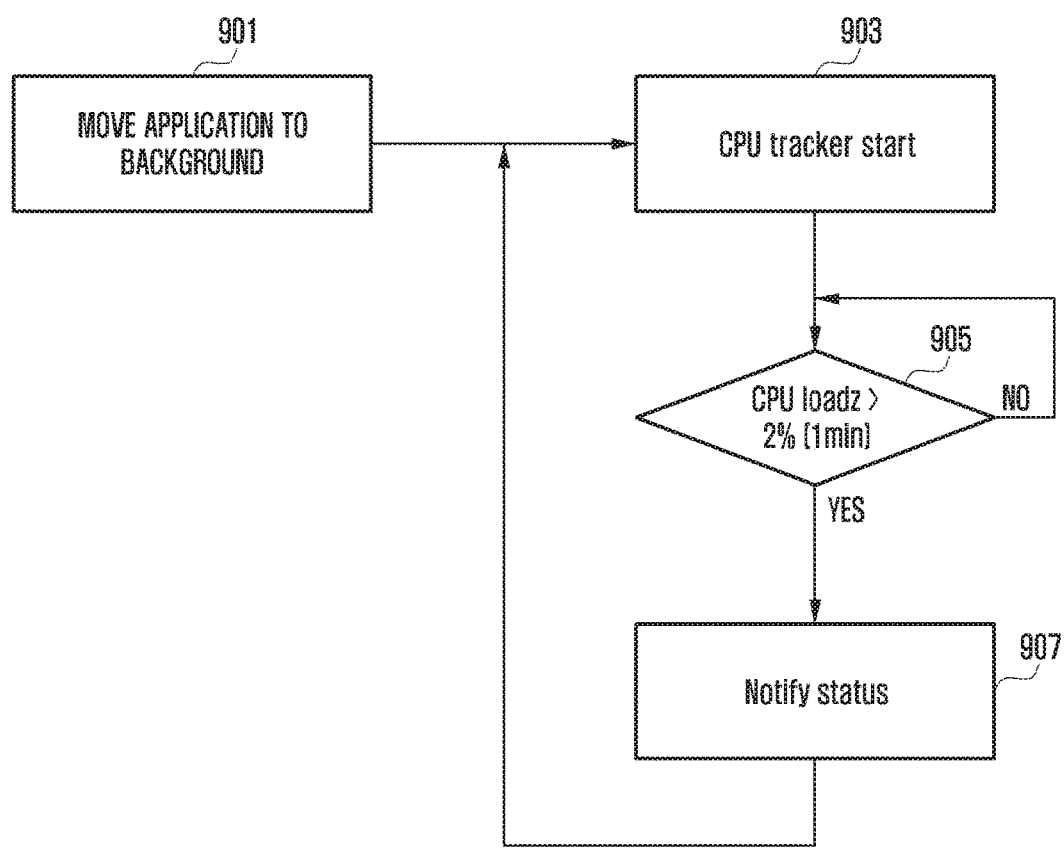

Referring to FIG. 9A, when a certain application excessively occupies a CPU load (e.g., a CPU usage rate) in a display-on status, the processor 410 may provide a corresponding notification regarding the application to a user. For example, at operation 901, the processor 410 may move the first application to the background. At operation 903, the processor 410 may track applications and/or components using the CPU. At operation 905, the processor 410 may monitor a specific application occupying over 2% of a CPU load at regular time intervals. Normally, an application (e.g., a music application) running even on the background may not exceed 2% of a CPU load. Therefore, the processor 410 may determine that an application occupying over 2% of a CPU load is abnormally operating. At operation 907, the processor 410 may provide a notification regarding this application occupying over 2% of a CPU load to a user. A criterion to determine an abnormal situation at operation 905 may be changed by a user or a developer.

Figure 9B:
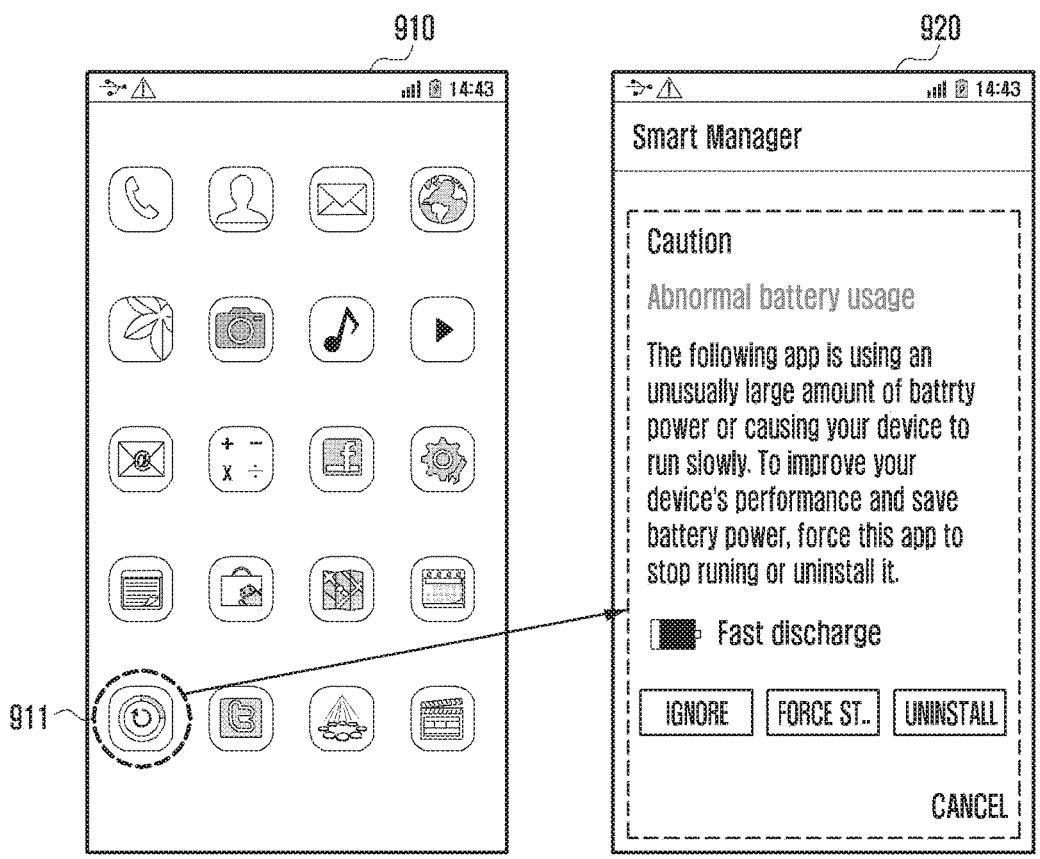

FIG. 9B is a diagram associated with operations shown in FIG. 9A.

Referring to FIG. 9B, if any abnormally running application is detected, the processor 410 may provide a notification to a user and also display which application is abnormally operating. For example, a screen 910 may be a home screen which displays application icons. If a certain abnormally running application is detected, the processor 410 may highlight an icon of the detected application (e.g., Smart Manager application). Then if a user input 911 is received at the icon of the detected application, the processor 410 may display detailed information associated with the abnormally running application on a screen 920.

Figure 9C:
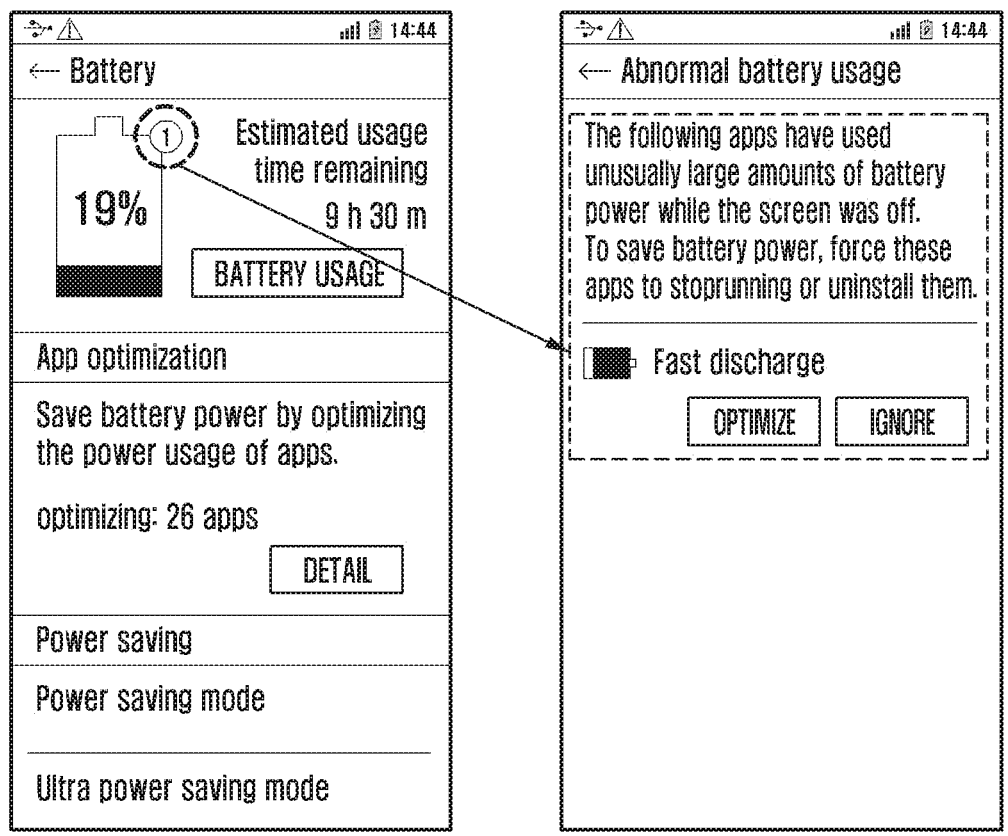

Referring to FIG. 9C, the processor 410 may indicate a list of abnormally running applications and also take an action corresponding to a policy with regard to each application contained in the list. For example, the processor 410 may display an "optimize" button and an "ignore" button for each application and thus allow a user to decide whether to perform a policy regarding the abnormally running application.

If a user selects the "optimize" button, the processor 410 may perform a specific policy regarding the corresponding application. For example, when ten minutes pass after the display 430 is turned off, the application set to perform a policy may forcibly stop running. Alternatively, the application set to perform a policy may perform an operation of releasing the wakelock.

FIG. 9D illustrates a user interface related to an application which is abnormally running in a display-on status.

Referring to FIG. 9D, a screen 951 may be provided as a screen of a setting menu for determining whether to perform a policy regarding an abnormally running application. A screen 953 may then be provided as a notification screen which offers a notification about a policy performed regarding an abnormally running application. A screen 955 may then be provided as a notification screen which offers information associated with an abnormal operation of the application when a user selects "detail view" on the screen 953.

Figure 10A:
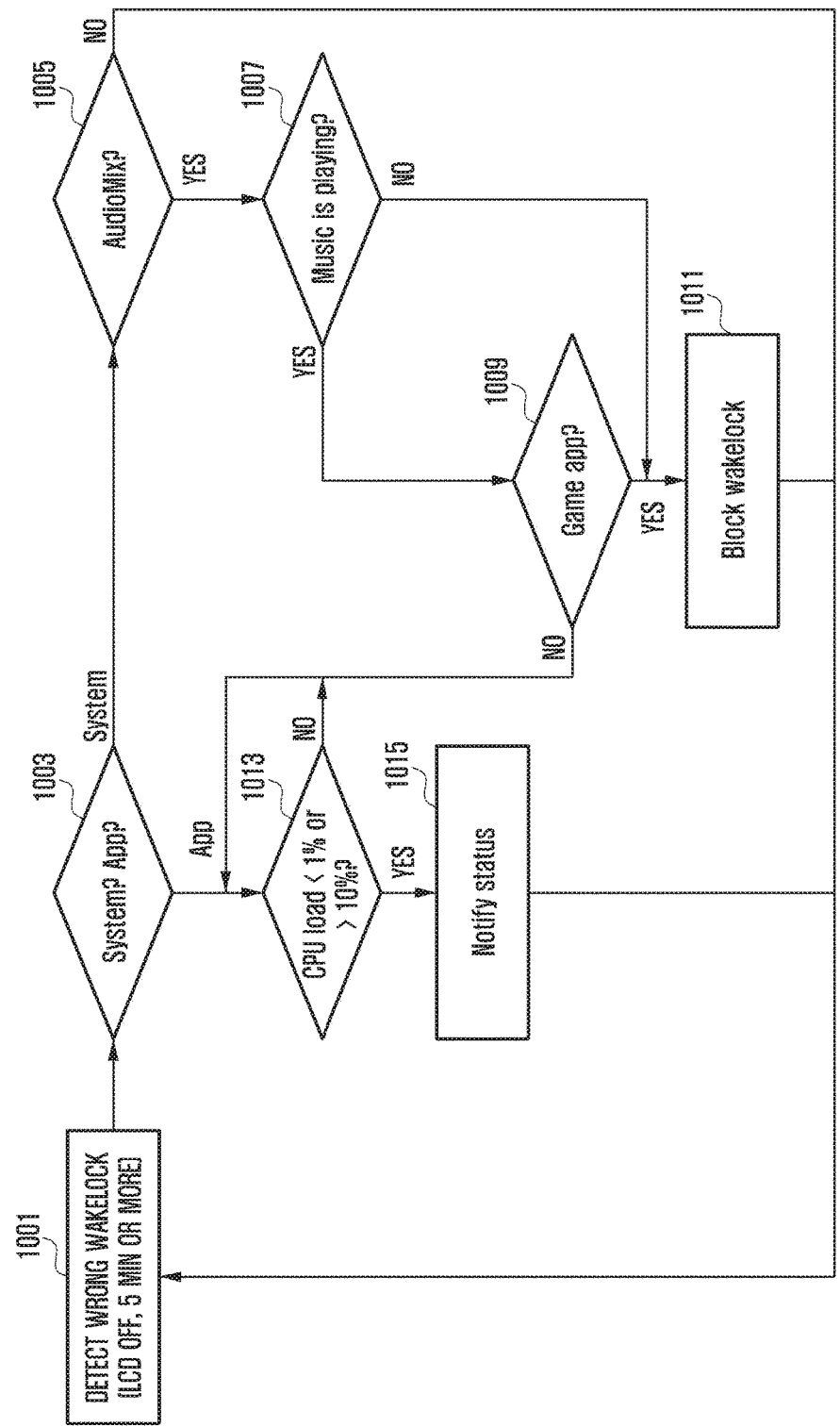
Figure 10B:
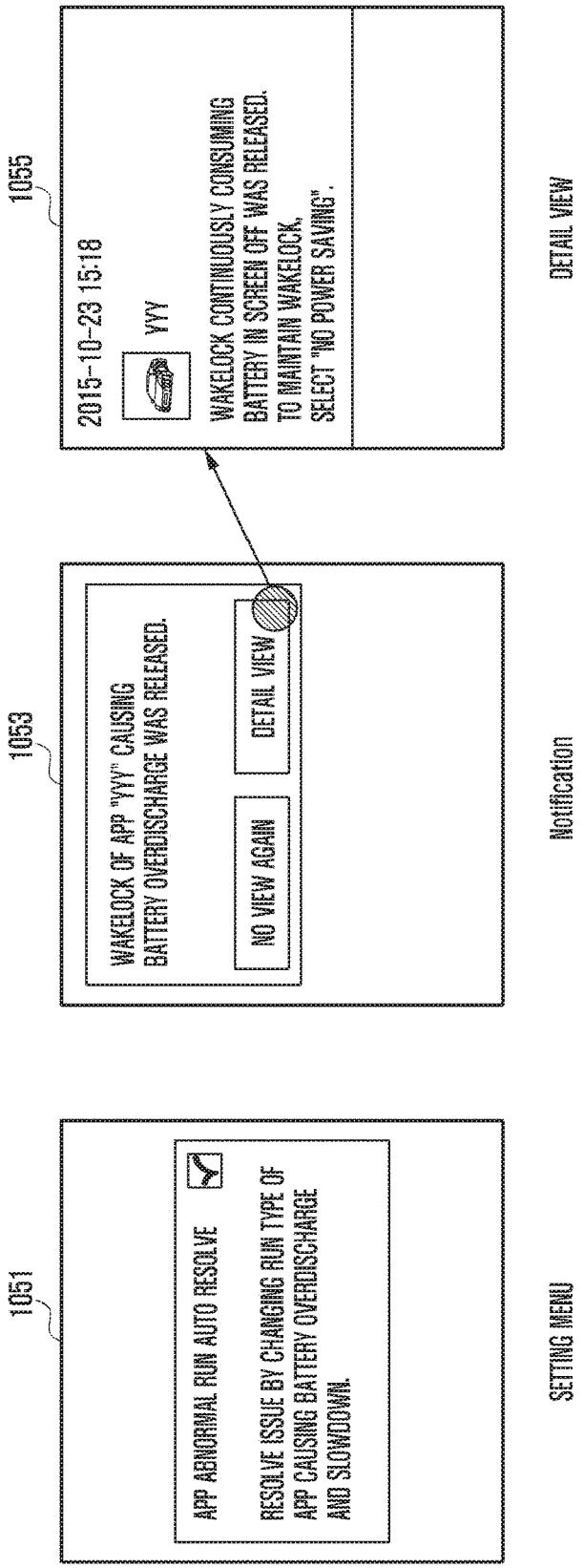

FIGS. 10A, 10B and 10C are diagrams illustrating operations of providing a notification about at least one of an application and a component, which separately or in combination cause excessive power consumption, in a display-off status according to various embodiments of the present disclosure.

Referring to FIG. 10A, if an abnormal wakelock is detected while the display 430 is turned off, the processor 410 may release or block the wakelock or offer a notification about the wakelock to a user. For example, at operation 1001, the processor 410 may detect an abnormal wakelock. If a specific wakelock is running continuously for five minutes or more in a display-off status, the processor 410 may determine that the specific wakelock is an abnormally operating wakelock.

At operation 1003, the processor 410 may determine whether the wakelock is a system-related wakelock or an application-related wakelock. For example, in case of the system-related wakelock, the processor 410 may identify, at operation 1005, whether the wakelock is regarding Audio-Mix. In case of the wakelock regarding AudioMix, the processor 410 may determine, at operation 1007, whether music is playing. If music is not playing, the processor 410 may determine that the wakelock is abnormally operating. Then, at operation 1011, the processor 410 may block the wakelock. If music is playing at operation 1007, the processor 410 may determine, at operation 1009, whether the running application is related to a game. In the case of a game-related application at operation 1009, the processor 410 may determine that the wakelock regarding AudioMix is an abnormal wakelock. For example, if music corresponding to a game-related application is playing in a display-off status, the processor 410 may determine that this situation is abnormal. In the case of a game-unrelated application at operation 1009, the processor 410 may check, at operation 1013, a CPU load rate (e.g., a CPU usage rate).

If it is determined at operation 1003 that the wakelock detected at operation 1001 is an application-related wakelock, the processor 410 may determine, at operation 1013, whether a CPU load is less than 1% or more than 10%. If the CPU load is less than 1% or more than 10%, the processor 410 may provide, at operation 1015, a notification to a user. Normally, when the CPU load is less than 1% or more than 10% in a display-off status, the processor 410 may determine that this situation is abnormal. A criterion to determine an abnormal situation at operation 1013 may be changed by a user or a developer.

FIG. 10B illustrates an application-related user interface in case where a wakelock is maintained to stop the CPU from entering a sleep mode.

Referring to FIG. 10B, a screen 1051 may be provided as a screen of a setting menu for determining whether to perform a policy regarding an abnormally running (e.g., maintaining a wakelock) application. A screen 1053 may then be provided as a notification screen which offers a notification about a policy performed regarding an abnormally running application. A screen 1055 may then be provided as a notification screen which offers detailed information about the application when a user selects "detail view" on the screen 1053.

FIG. 10C illustrates an application-related user interface in case where a wakelock is maintained in a display-off status.

Referring to FIG. 10C, the processor 410 may provide, to a user, a notification regarding the wakelock abnormally maintained in a display-off status without a user's setting. On screens 1061 and 1063, a user interface set by a user may not be provided. However, on a screen 1065, the processor 410 may notify a user of detailed information about the application corresponding to the abnormally maintained wakelock.

Figure 11A:
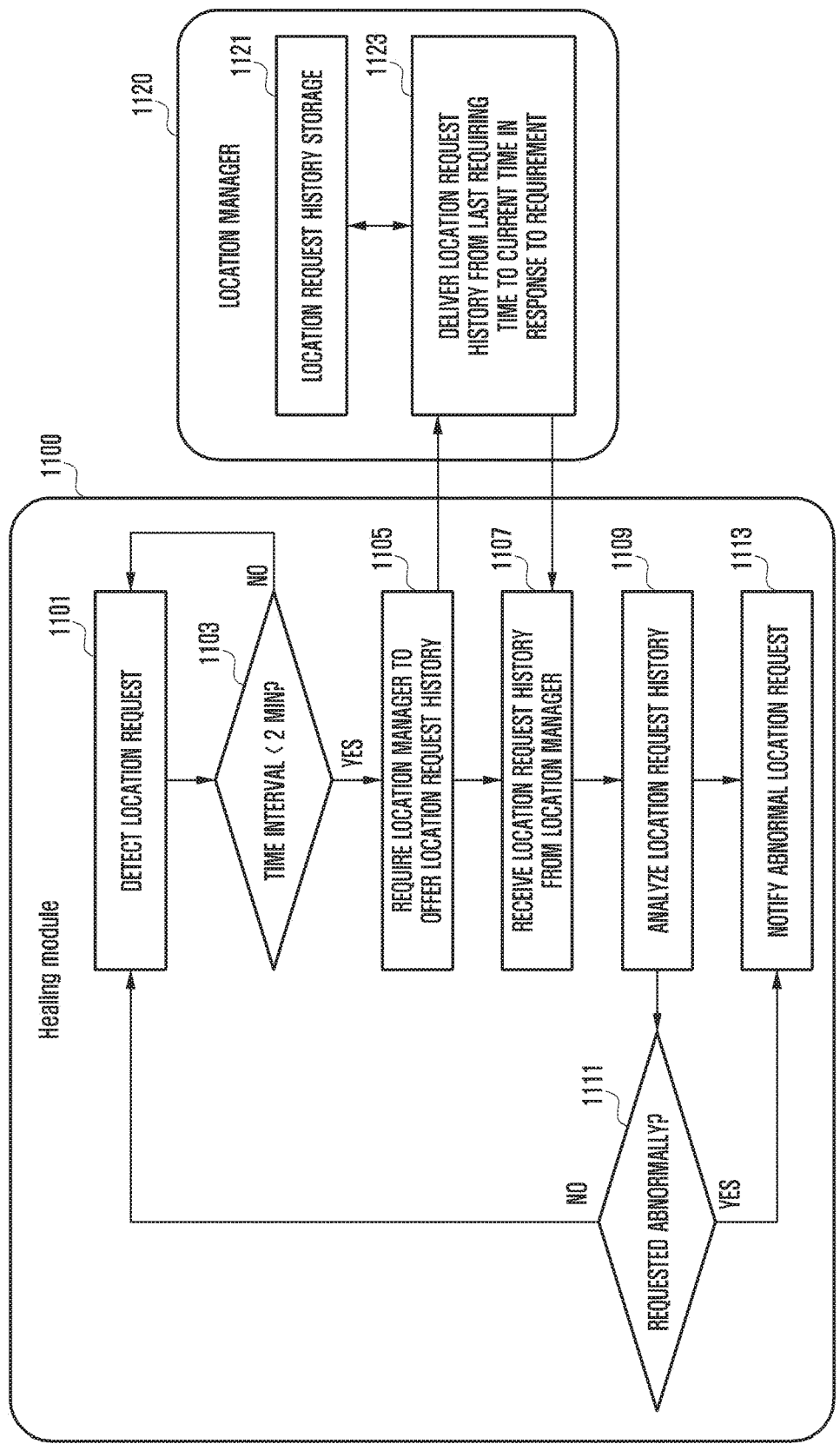
FIGS. 11A and 11B are diagrams illustrating operations of providing a notification in a case of excessive power consumption caused by frequent location requests, according to various embodiments of the present disclosure.
Figure 11B:
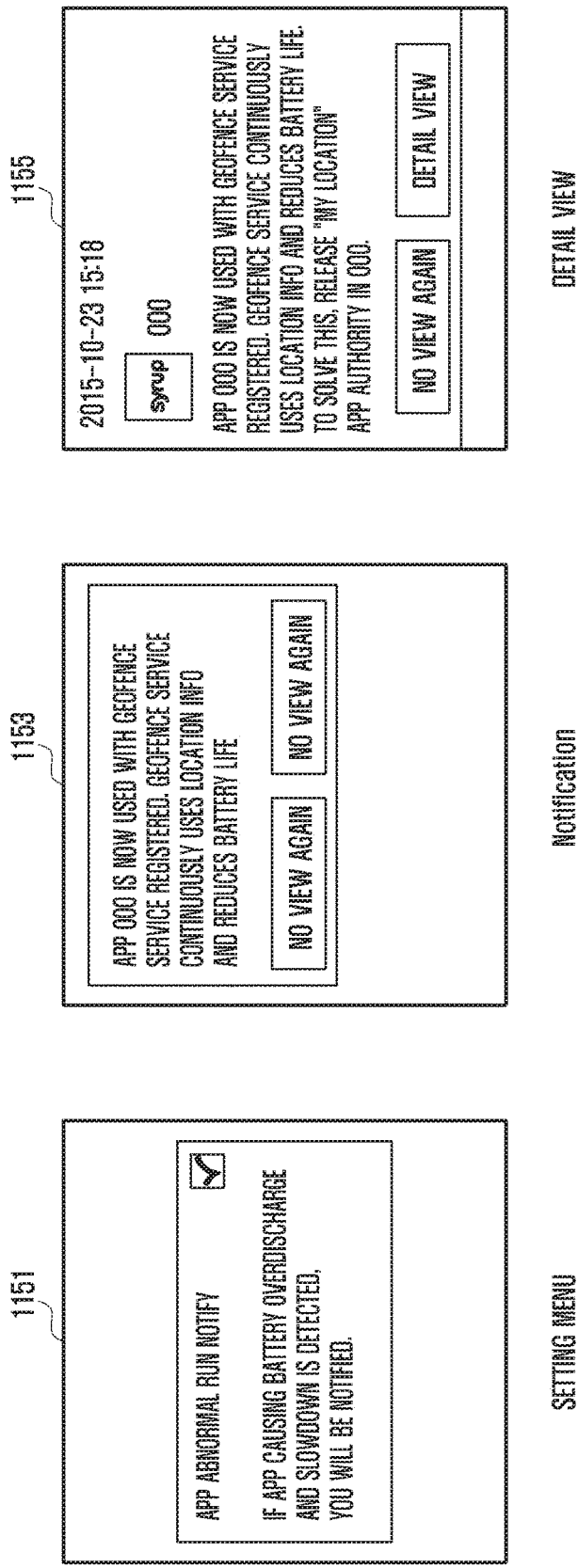

FIGS. 11A and 11B are diagrams illustrating operations of providing a notification in case of excessive power consumption caused by frequent location requests, according to various embodiments of the present disclosure.

Referring to FIG. 11A, the diagram shows operations of a healing module 1100 (i.e., the healing module 610 in FIG. 6A) and operations of a location manager 1120 (i.e., the LMS 642 in FIG. 6B), which are included in the processor 410. At operation 1101, the processor 410 may detect a location request of an application through the healing module 1100. For example, the electronic device 400 may use an application (hereinafter, a location application) which provides information based on the location of the electronic device 400. The location application may track the location of the electronic device 400 continuously or at irregular or regular time intervals. Additionally, the location application may identify the location of the electronic device 400 by considering environments and communication status of the electronic device 400. At operation 1101, the processor 410 may determine whether the location application frequently requests location tracking.

At operation 1103, the processor 410 may check whether a time interval of location requests is less than two minutes. Namely, the processor 410 may check whether a request signal for tracking the location of the electronic device 400 is received every two minutes or less. If the time interval is less than two minutes, the processor 410 may require, at operation 1105, the location manager 1120 to offer a location request history. In response to this requirement, the location manager 1120 may receive, from a location request history storage at operation 1121, the location request history from the previously requiring time to the current time. Then the location manager 1120 may deliver the received location request history to the healing module 1100 at operation 1123.

The processor 410 may receive the location request history from the location manager 1120 at operation 1107 and analyze the received location request history at operation 1109. At operation 1111, the processor 410 may determine whether a location tracking request signal is abnormal, based on the analyzed location request history. The processor 410 may then perform a policy corresponding to the result of the determination. If the location request is made abnormally and/or excessively at operation 1111, the processor 410 may provide, at operation 1113, a notification regarding the abnormal location request to a user. Although not shown, the processor 410 may also perform a policy for changing a time interval of such location requests in response to the abnormal location request. According to various embodiments, a plurality of policies corresponding to abnormal situations may be established by a user or a developer.

FIG. 11B illustrates a user interface related to an application which excessively requests location information of the electronic device.

Referring to FIG. 11B, a screen 1151 may be provided as a screen of a setting menu for determining whether to perform a policy regarding an abnormally running application. A screen 1153 may then be provided as a notification screen which provides a notification about a policy performed regarding an abnormally running application. A screen 1155 may then be provided as a notification screen which provides detailed information about the application when a user selects "detail view" on the screen 1153.

Figure 12A:
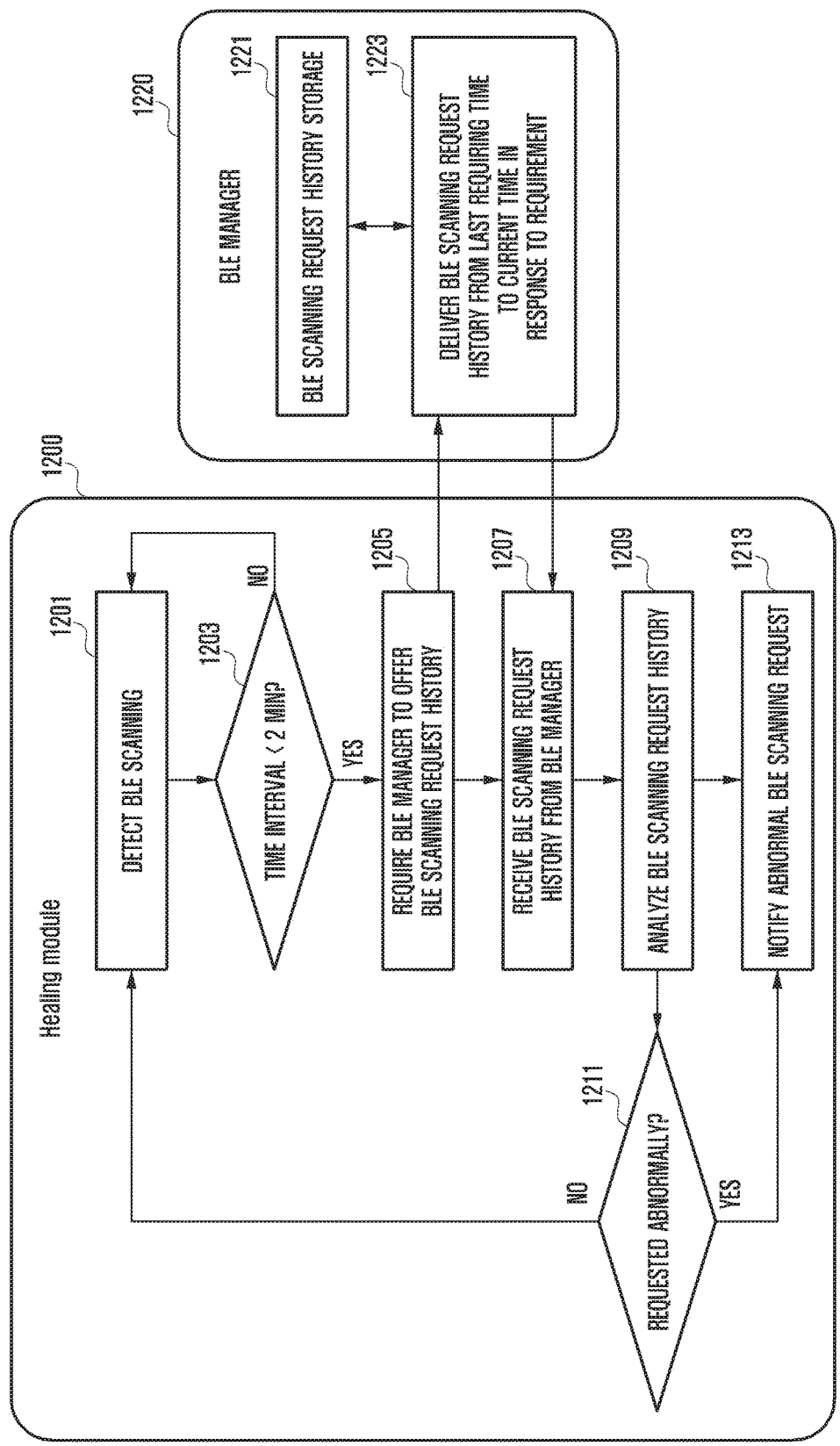
FIGS. 12A and 12B are diagrams illustrating operations of providing a notification in a case of excessive power consumption caused by frequent Bluetooth low energy (BLE) scanning, according to various embodiments of the present disclosure.
Figure 12B:
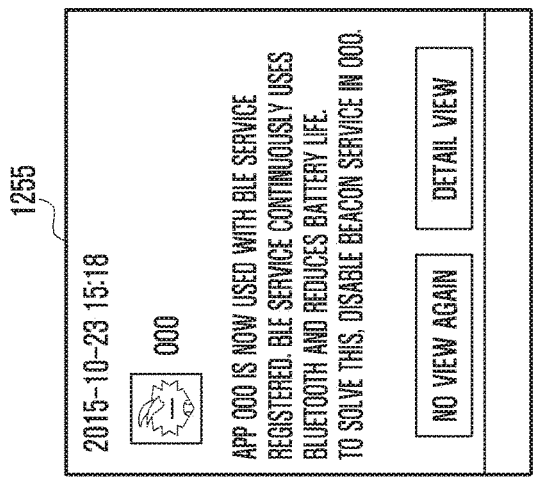
Figure 12B:
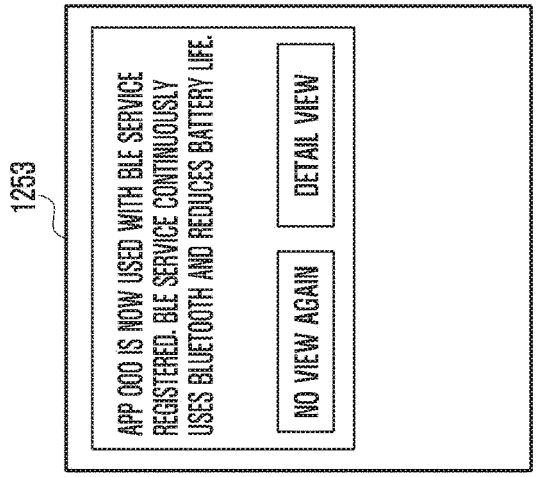
Figure 12B:
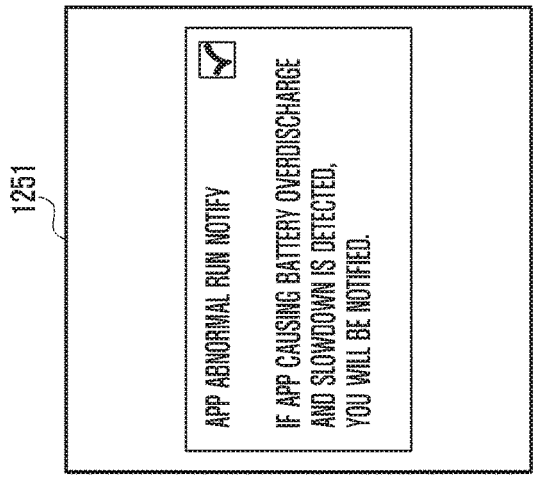

FIGS. 12A and 12B are diagrams illustrating operations of providing a notification in case of excessive power consumption caused by frequent BLE scanning, according to various embodiments of the present disclosure.

Referring to FIG. 12A, the diagram shows operations of a healing module 1200 (i.e., the healing module 610 in FIG. 6A) and a BLE manager 1220 (i.e., the BT 646 in FIG. 6B), which are included in the processor 410. At operation 1201, the processor 410 may detect a BLE scanning of an application through the healing module 1200. For example, the electronic device 400 may use an application (hereinafter, a BLE application) which needs a BT connection with other neighboring electronic device. The BLE application may perform the BLE scanning for discovering other electronic devices adjacent to the electronic device 400 continuously or at irregular or regular time intervals. Additionally, the BLE application may perform the BLE scanning by considering environments and communication status of the electronic device 400. At operation 1201, the processor 410 may determine whether the BLE application frequently requests the BLE scanning.

At operation 1203, the processor 410 may check whether a time interval of BLE scanning requests is less than two minutes. If the time interval is less than two minutes, the processor 410 may require, at operation 1205, the BLE manager 1220 to offer a BLE scanning request history. In response to this requirement, the BLE manager 1220 may receive, from a BLE request history storage at operation 1221, the BLE request history from the previously requiring time to the current time. Then the BLE manager 1220 may deliver the received BLE scanning request history to the healing module 1200 at operation 1223.

The processor 410 may receive the BLE scanning request history from the BLE manager 1220 at operation 1207, and analyze the received BLE scanning request history at operation 1209. At operation 1211, the processor 410 may determine whether a BLE scanning request is abnormal, based on the analyzed BLE scanning request history. The processor 410 may then perform a policy corresponding to the result of determination. If the BLE scanning request is made abnormally at operation 1211, the processor 410 may provide, at operation 1213, a notification regarding the abnormal BLE scanning request to a user. Although not shown, the processor 410 may also perform a policy for changing a time interval of such BLE scanning requests in response to the abnormal BLE scanning request. According to various embodiments, a plurality of policies corresponding to abnormal situations may be established by a user or a developer.

FIG. 12B illustrates a user interface related to an application which excessively requests BLE scanning. A screen 1251 may be provided as a screen of a setting menu for determining whether to perform a policy regarding an abnormally running application. A screen 1253 may then be provided as a notification screen which provides a notification about a policy performed regarding an abnormally running application. A screen 1255 may then be provided as a notification screen which provides detailed information about the application when a user selects "detail view" on the screen 1253.

Figure 13A:
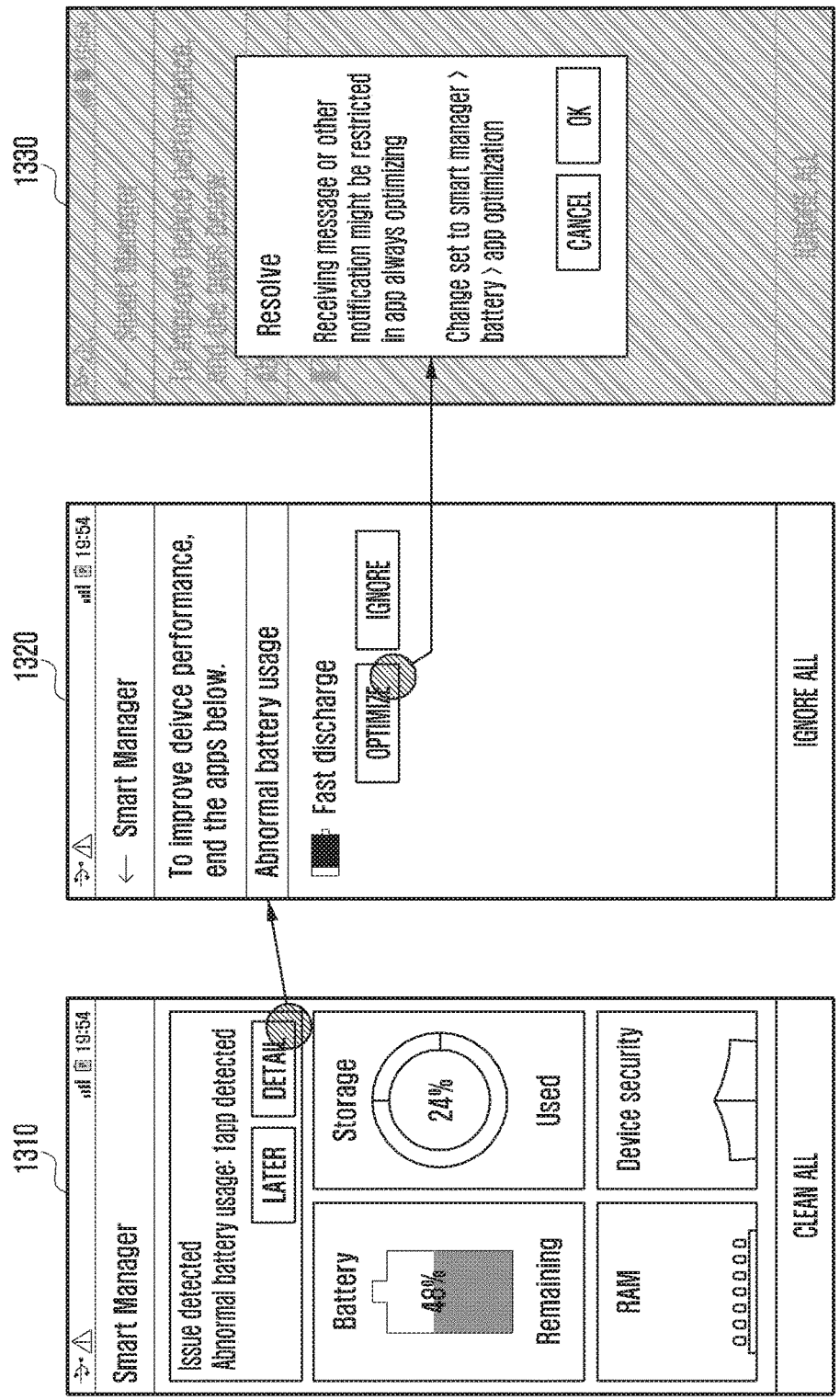
FIGS. 13A and 13B are diagrams illustrating an example of a user interface for intuitively setting each of applications causing excessive power consumption, according to various embodiments of the present disclosure.
Figure 13B:
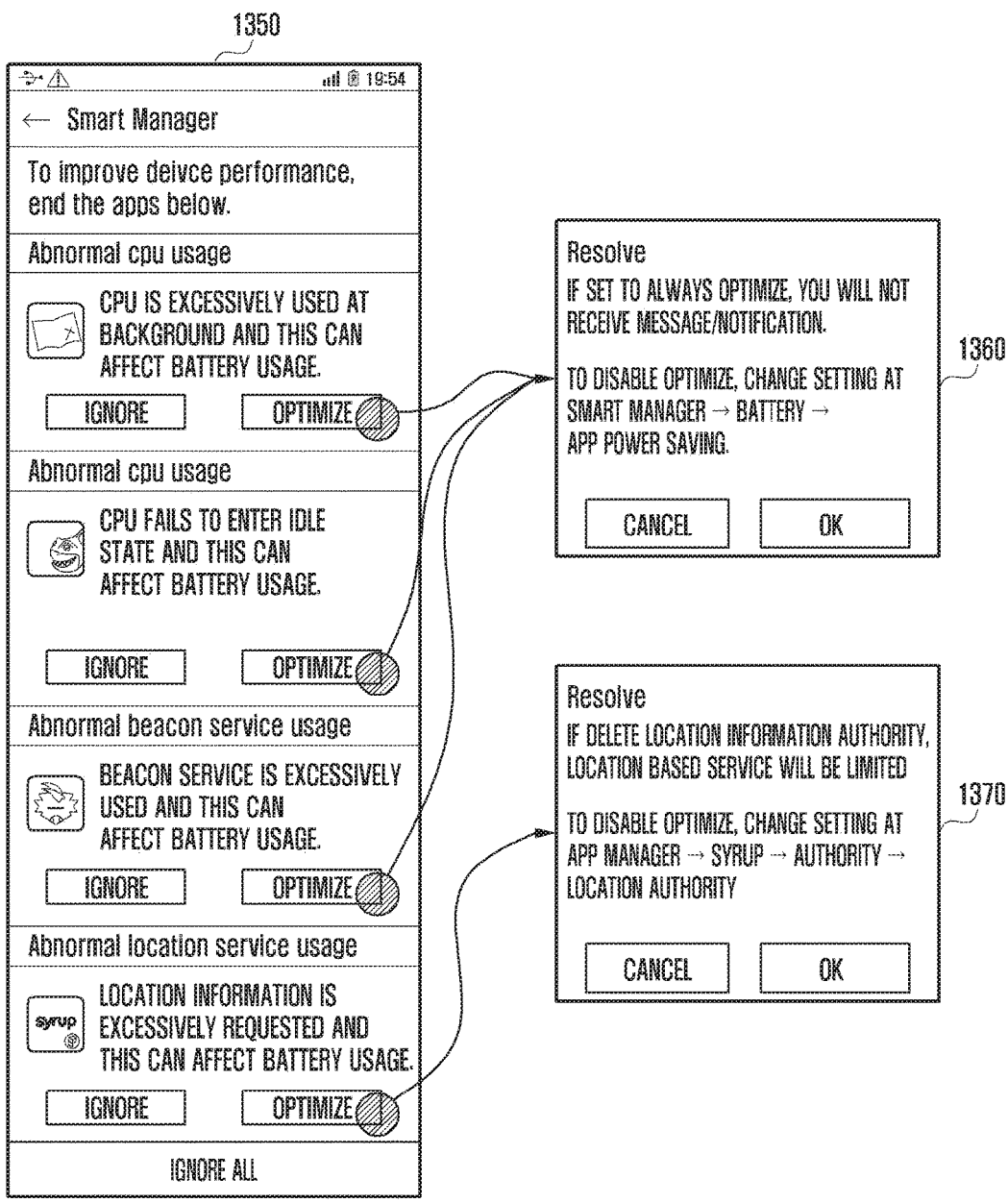

FIGS. 13A and 13B are diagrams illustrating an example of a user interface for intuitively setting each of applications causing excessive power consumption, according to various embodiments of the present disclosure.

Referring to FIG. 13A, a screen 310 shows a user interface of a "smart manager" which offers information associated with applications installed and components embedded in the electronic device 400. The "smart manager" may detect one or more applications and components which separately or in combination excessively consume battery power. On a screen 1320, the processor 410 may change settings for the applications and components which excessively consume battery power. On a screen 1330, the processor 410 may then provide a description about the changed setting to a user.

FIG. 13B shows a user interface for individually setting whether to perform policies for respective applications at the electronic device.

Referring to FIG. 13B, according to various embodiments, on a screen 1350, policy-related settings may be performed with regard to respective applications, and on screens 1360 and 1370, operations to be performed may be set in response to the respective policies.

Figure 14A:
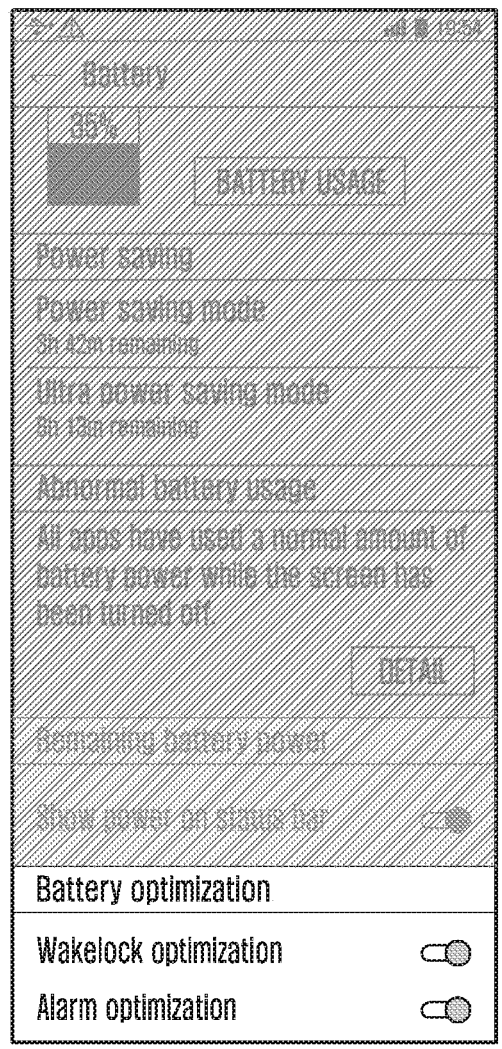
FIGS. 14A and 14B are diagrams illustrating an example of a user interface for detecting and controlling an application and a component, which cause excessive power consumption, according to various embodiments of the present disclosure.
Figure 14B:
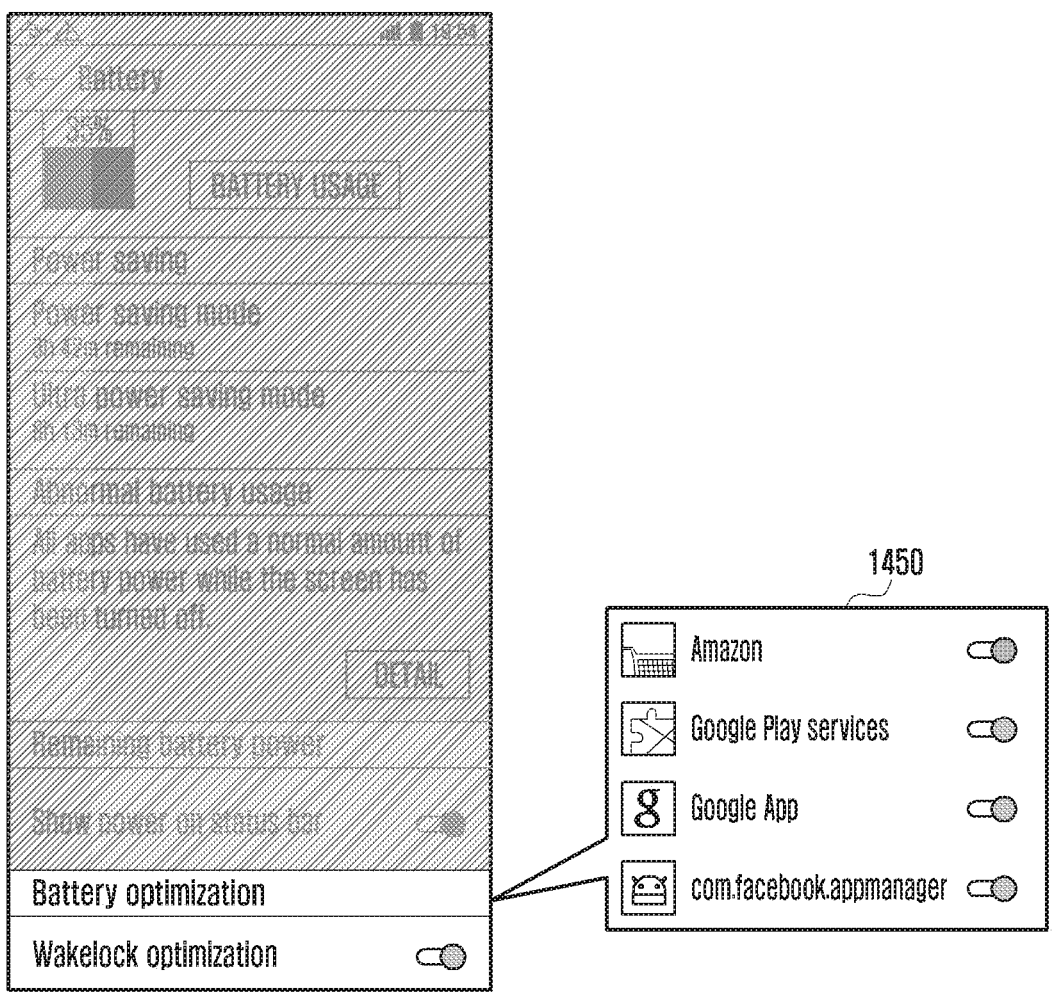

FIGS. 14A and 14B are diagrams illustrating an example of a user interface for detecting and controlling at least one of an application and a component, which separately or in combination cause excessive power consumption, according to various embodiments of the present disclosure.

Referring to FIG. 14A, in setting related to policies, the processor 410 may determine whether to perform each policy according to each abnormal situation. Based on setting in this user interface, the processor 410 may release a wakelock about an abnormal situation and also change an alarm period.

For example, a "Wakelock optimization" corresponding to the wakelock release may be activated on the user interface. If any abnormal situation about the wakelock occurs, the processor 410 may release the wakelock. For example, if an application is moved to the background and then the wakelock of the application maintains an activated state by passing a given time, the processor 410 may determine that this situation of wakelock is abnormal. In response to this abnormal situation, the processor 410 may perform a policy for releasing the wakelock. As shown in FIG. 14A, the processor 410 may determine whether to perform each policy with regard to each abnormal situation. The processor 410 may perform different policies, based on abnormal situations. Also, the processor 410 may establish details of a policy by a user or a developer.

In another example, "Alarm optimization" corresponding to an alarm period change may be activated in the user interface. If any abnormal situation about an alarm period change occurs, the processor 410 may change the alarm period. For example, if a location request signal is abnormally frequent, the processor 410 may determine that the location request signal is abnormal. Then in response to this abnormal situation, the processor 410 may change the request period. The processor 410 may establish details of a change in the request period by a user or a developer.

Referring to FIG. 14B, the processor 410 may determine whether to perform a policy according to each application. For example, as shown in FIG. 14A, the processor 410 may determine whether to perform a policy according to each abnormal situation, and then further determine whether to perform a policy according to each application in the abnormal situation as shown in display 1450 of FIG. 14B. The processor 410 may be set to perform a policy in response to an abnormal situation in which the wakelock is placed abnormally and continuously in an activated state. In detail, the processor 410 may be set to perform each policy regarding each application in response to the above-described abnormal situation.

According to various embodiments, an operating method of an electronic device may include operations of monitoring an operation of an application installed in the electronic device or an operation of a component embedded in the electronic device, checking the amount of power consumed for the operation of the application or the operation of the component continuously or at irregular or regular intervals and based on the checked amount of power, determining whether the operation of the application or the operation of the component is an abnormal operation. If the operation of the application or the operation of the component is determined to be an abnormal operation, the method further includes operations of identifying a policy corresponding to the abnormal operation and based on the identified policy, controlling the operation of the application or the operation of the component.

The operation of determining the abnormal operation may include operations of, if the application is moved to background, checking whether a CPU usage rate corresponding to the operation of the application exceeds a first threshold and if the CPU usage rate exceeds the first threshold, determining that the operation of the application is an abnormal operation.

The operation of determining the abnormal operation may also include operations of, when a display of the electronic device is turned off, checking whether a wakelock of the application maintains an activated state for a time exceeding a second threshold and if the wakelock maintains the activated state for the time exceeding the second threshold, determining whether the application is a music related application. If the application is not a music related application, the method may further include operations of determining that the operation of the application is an abnormal operation.

The operation of controlling the operation of the application may also include an operation of releasing a wakelock of the application so as to inactivate the wakelock.

The method may further include an operation of providing a notification message indicating detailed information about release of the wakelock.

The operation of determining the abnormal operation may also include operations of detecting a location request signal generated from the application, checking whether a time interval of detecting the location request signal is less than a third threshold and if the time interval is less than the third threshold, determining that the operation of the application is an abnormal operation.

The operation of determining the abnormal operation may also include operations of detecting a BLE scanning request signal generated from the application, checking whether a time interval of detecting the BLE scanning request signal is less than a fourth threshold and if the time interval is less than the fourth threshold, determining that the operation of the application is an abnormal operation.

The policy may be differently established regarding the operations of the application and the component so as to determine abnormal operations of the application and the component.

The policy may be established to terminate all operations of the application and the component or only specific a part of the operations of the application and the component, or provide a notification message indicating the abnormal operation through a display.

At least part of the device (e.g., modules or functions thereof) or method (e.g., operations) according to various embodiments may be implemented as commands stored, e.g., in the form of program modules, in a computer-readable storage medium. In case commands are executed by at least one processor, this processor may then be configured to perform a particular function corresponding to the commands. The computer-readable storage medium may be, for example, the memory. At least some of the program modules may be implemented (e.g., executed) by, for example, the processor. At least some of the program modules may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc-ROM (CD-ROM) and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of this disclosure, and vice versa.

A module or programming module according to various embodiments may include or exclude at least one of the above-discussed elements or further include other elements or combinations thereof. The operations performed by the module, programming module or any other element according to various embodiments may be executed sequentially, in parallel, repeatedly, or by a heuristic method. Additionally, some operations may be executed in different orders or omitted, or other operations may be added.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device, comprising:
    a display;
    a memory configured to:
        store an application, and
        store a policy for controlling an operation of at least one of the application or a component of the electronic device;
    a power management module configured to check an amount of power consumed for the operation of at least one of the application or the component; and
    at least one processor configured to:
        check, through the power management module, the amount of power consumed for the operation of the at least one of the application or the component at regular intervals,
        determine, based on the checked amount of power, whether the operation of the at least one of the application or the component is an abnormal operation,
        identify if the operation of the at least one of the application or the component is the abnormal operation, the policy of each of the at least one of the application or the component, respectively, and corresponding to the abnormal operation, determine, if the application is run in the background, whether a central processing unit (CPU) usage rate corresponding to the operation of the application exceeds a threshold, and display, if the CPU usage rate exceeds the threshold, a notification message indicating the abnormal operation for running the application on the display.

2. The electronic device of claim 1, wherein the at least one processor is further configured to:

check, when the display is turned off, whether a wakelock of the application maintains an activated state for a time exceeding a threshold, determine, if the wakelock maintains the activated state for the time exceeding the threshold, whether the application is a music related application, and determine, if the application is not a music related application, that the operation of the application is an abnormal operation.

3. The electronic device of claim 2, wherein the at least one processor is further configured to:

control the operation of the application by releasing the wakelock so as to inactivate the wakelock of the application.

4. The electronic device of claim 3, wherein the at least one processor is further configured to:

provide a notification message indicating detailed information about the release of the wakelock through the display.

5. The electronic device of claim 2, wherein the wakelock is a command for waking the electronic device in a sleep mode or for preventing the electronic device from entering the sleep mode.

6. The electronic device of claim 1, wherein the at least one processor is further configured to:

detect a location request signal generated from the application, check whether a time interval of detecting the location request signal is less than a threshold, and determine, if the time interval is less than the threshold, that the operation of the application is an abnormal operation.

7. The electronic device of claim 1, wherein the at least one processor is further configured to:

detect a Bluetooth low energy (BLE) scanning request signal generated from the application, check whether a time interval of detecting the BLE scanning request signal is less than a threshold, and determine, if the time interval is less than the threshold, that the operation of the application is an abnormal operation.

8. The electronic device of claim 1, wherein each policy is differently established regarding the operations of the application and the component so as to determine abnormal operations of the application and the component, respectively.

9. The electronic device of claim 1, wherein at least one policy is established to terminate only a part of the operations of the at least one of the application or the component to eliminate the abnormal operation.

10. An operating method of an electronic device, the method comprising:

checking an amount of power consumed for an operation of the at least one of an application or a component at regular intervals;

determining, based on the checked amount of power, whether the operation of the at least one of the application or the component is an abnormal operation;

identifying, if the operation of the at least one of the application or the component is the abnormal operation, a policy of each of the at least one of the application or the component, respectively, and corresponding to the abnormal operation;

determining, if the application is run in the background, whether a central processing unit (CPU) usage rate corresponding to the operation of the application exceeds a threshold; and displaying, if the CPU usage rate exceeds the threshold, a notification message indicating the abnormal operation for running the application.

11. The method of claim 10, wherein the determining of the abnormal operation includes:

checking, when a display of the electronic device is turned off, whether a wakelock of the application maintains an activated state for a time exceeding a threshold;

determining, if the wakelock maintains the activated state for the time exceeding the threshold, whether the application is a music related application; and determining, if the application is not a music related application, that the operation of the application is an abnormal operation.

12. The method of claim 11, wherein the controlling of the operation of the application includes:

releasing a wakelock of the application so as to inactivate the wakelock.

13. The method of claim 12, further comprising:

providing a notification message indicating detailed information about release of the wakelock.

14. The method of claim 10, wherein the determining of the abnormal operation includes:

detecting a location request signal generated from the application;

checking whether a time interval of detecting the location request signal is less than a threshold; and determining, if the time interval is less than the threshold, that the operation of the application is an abnormal operation.

15. The method of claim 10, wherein the determining of the abnormal operation includes:

detecting a Bluetooth low energy (BLE) scanning request signal generated from the application;

checking whether a time interval of detecting the BLE scanning request signal is less than a threshold; and determining, if the time interval is less than the threshold, that the operation of the application is an abnormal operation.

16. The method of claim 10, wherein each policy is differently established regarding the operations of the application and the component so as to determine abnormal operations of the application and the component, respectively.

17. The method of claim 10, wherein at least one policy is established to terminate only a part of the operations of the at least one of the application or the component to eliminate the abnormal operation.

* * * * *